(12) United States Patent
Desai

(10) Patent No.: US 9,894,163 B2
(45) Date of Patent: Feb. 13, 2018

(54) SERVICE REQUEST MANAGEMENT METHODS AND APPARATUS

(71) Applicant: Nexus Vesting Group, LLC, Placentia, CA (US)

(72) Inventor: Samit V. Desai, Placentia, CA (US)

(73) Assignee: Nexus Vesting Group, LLC, Placentia, CA (US)

(*) Notice: Subject to any disclaimer, the term of this patent is extended or adjusted under 35 U.S.C. 154(b) by 571 days.

(21) Appl. No.: 14/194,983

(22) Filed: Mar. 3, 2014

(65) Prior Publication Data

US 2014/0250166 A1    Sep. 4, 2014

Related U.S. Application Data

(60) Provisional application No. 61/771,707, filed on Mar. 1, 2013.

(51) Int. Cl.
| | |
|---|---|
| *G06F 15/16* | (2006.01) |
| *H04L 29/08* | (2006.01) |
| *G06Q 30/02* | (2012.01) |
| *G06Q 30/06* | (2012.01) |

(52) U.S. Cl.
CPC .......... H04L 67/16 (2013.01); G06Q 30/02 (2013.01); G06Q 30/0601 (2013.01)

(58) Field of Classification Search
CPC .... G06Q 30/0601; G06Q 30/02; G06Q 30/08; G06Q 10/00; G06Q 10/06311; G06Q 10/06315; G06Q 10/10; G06Q 10/20; G06Q 50/01; G06Q 10/02; G06Q 10/06316; G06Q 10/06375; G06Q 10/08; G06Q 30/0269; G06Q 30/06; G06F 9/466; H04L 67/16

USPC .......... 709/203, 206, 246; 705/5, 7.13, 7.29, 705/26.1, 26.61, 305
See application file for complete search history.

(56) References Cited

U.S. PATENT DOCUMENTS

| | | | | |
|---|---|---|---|---|
| 6,272,467 | B1* | 8/2001 | Durand ................. | G06Q 10/02 705/26.1 |
| 2002/0156664 | A1* | 10/2002 | Willcox ................. | G06Q 10/04 705/7.26 |
| 2005/0060332 | A1* | 3/2005 | Bernstein .......... | G06F 17/30569 |
| 2007/0208878 | A1* | 9/2007 | Barnes-Leon ......... | G06Q 10/00 709/246 |

(Continued)

*Primary Examiner* — Dustin Nguyen
*Assistant Examiner* — Hao Nguyen
(74) *Attorney, Agent, or Firm* — K&L Gates LLP; Louis C. Cullman; Dennis A. Majewski

(57) ABSTRACT

A system, method, and apparatus for service request management are disclosed. An example method includes receiving service data from an information source and selecting a source data model that is associated with the information source, the source data model being configured to specify how the service data in a first format from the information source is to be mapped to data fields of a generic service data model. The example method also includes creating a service data entry of the generic service data model by applying the determined source data model to the service data and storing the service data into data fields of the service data entry. The example method further includes selecting a service provider based on the service data within the data fields of the service data entry and transmitting a service request message to the service provider including at least some of the service data.

21 Claims, 11 Drawing Sheets

(56) References Cited

U.S. PATENT DOCUMENTS

| | | | | |
|---|---|---|---|---|
| 2009/0299868 A1* | 12/2009 | O'Leary | ............... | G06Q 30/06 |
| | | | | 705/26.1 |
| 2010/0318324 A1* | 12/2010 | Kim | ................... | H04L 12/2825 |
| | | | | 702/183 |
| 2012/0284081 A1* | 11/2012 | Cheng | ................... | G06Q 30/02 |
| | | | | 705/7.29 |
| 2014/0101058 A1* | 4/2014 | Castel | ................... | G06Q 10/20 |
| | | | | 705/305 |
| 2014/0229335 A1* | 8/2014 | Chen | ..................... | G06Q 10/02 |
| | | | | 705/26.61 |

* cited by examiner

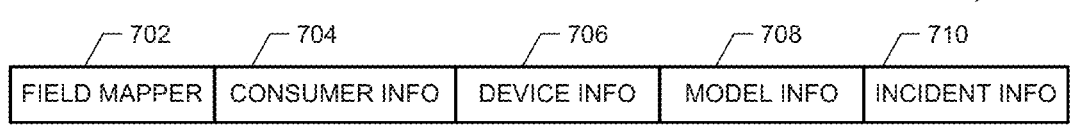
FIG. 6
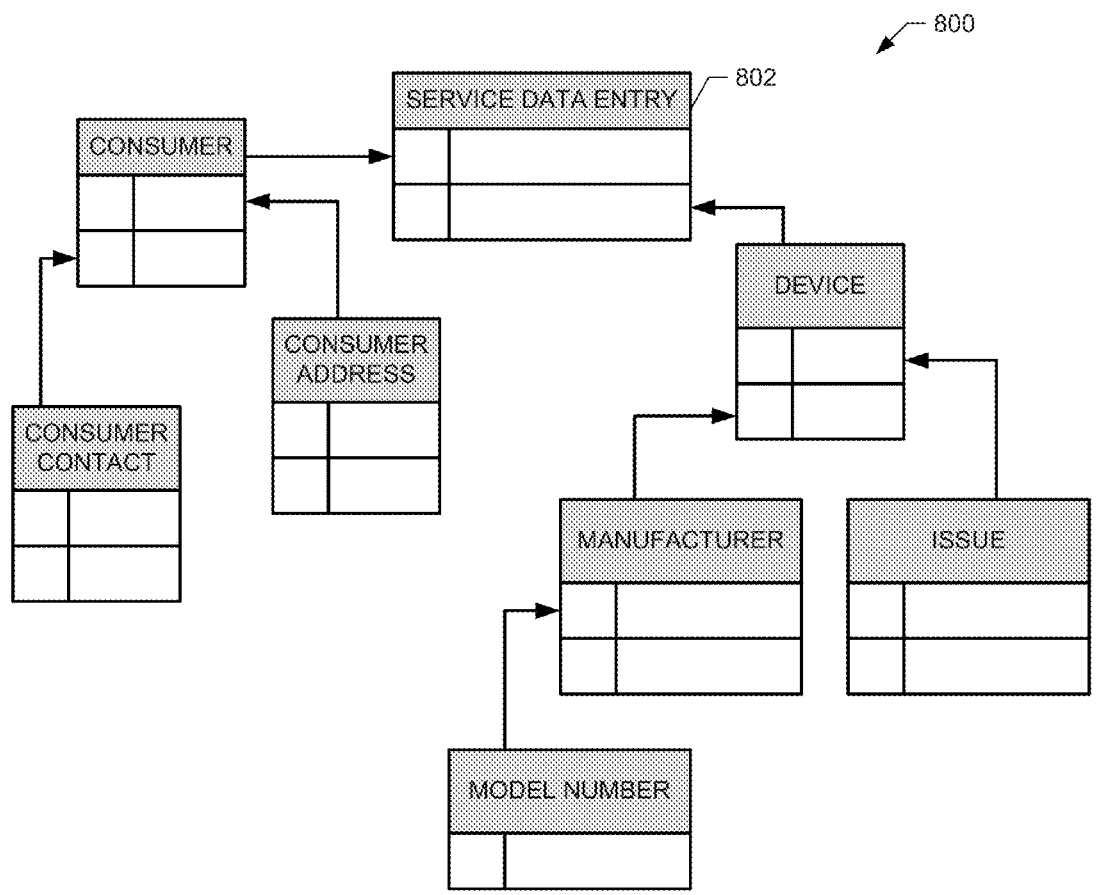
FIG. 7
FIG. 8

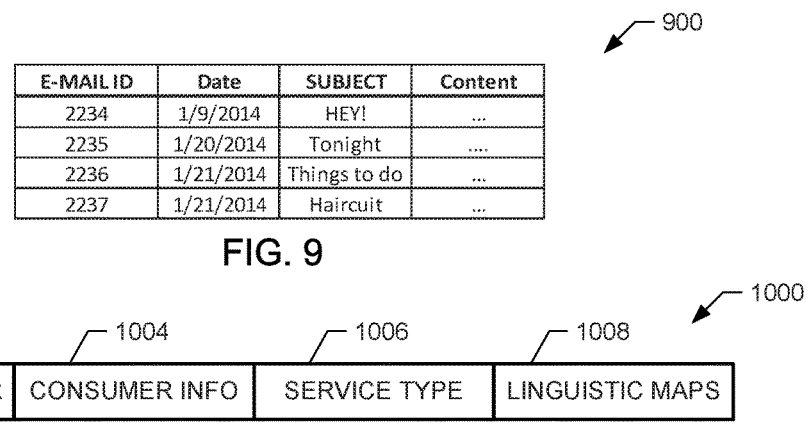
FIG. 9
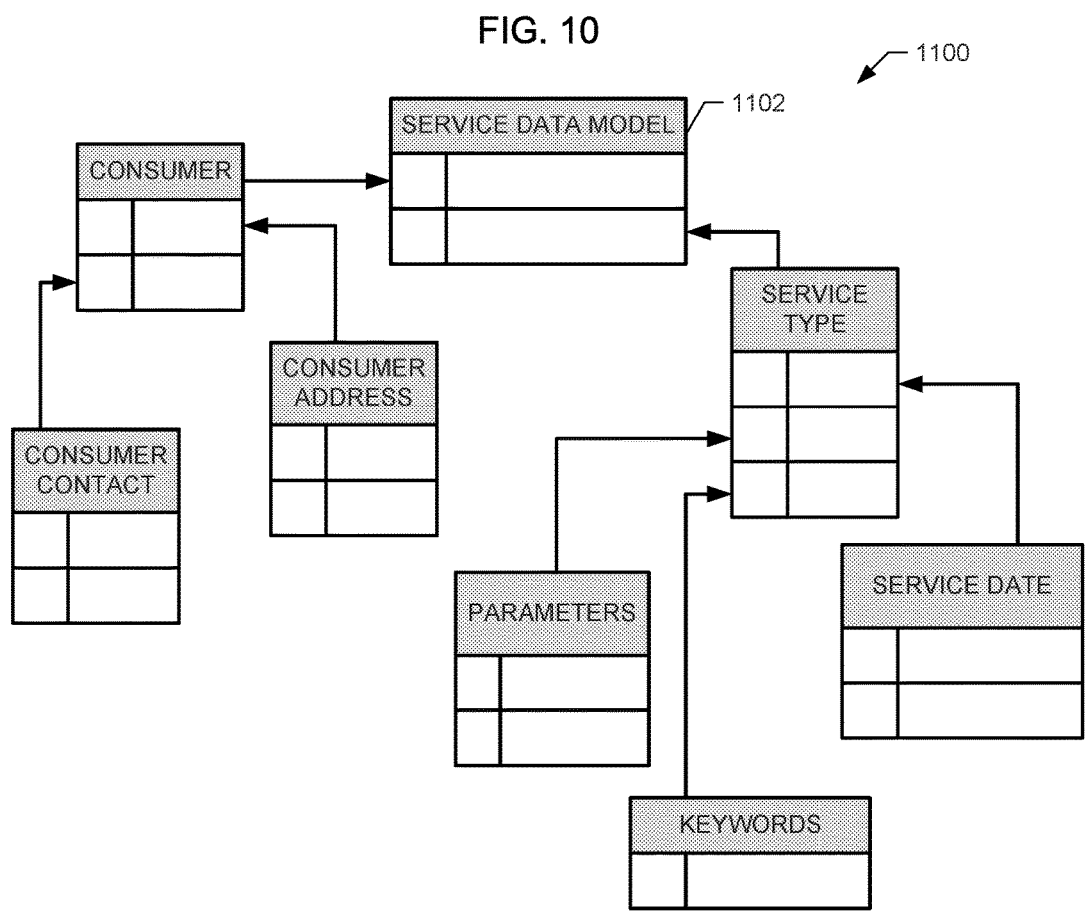
FIG. 10
FIG. 11

— 1700

| Service Provider | Location | Services | Devices | Brands Serviced |
|---|---|---|---|---|
| Provider A | Chicago | Appliance Service/Repair | Oven, Refrigerator, Washer, Dryer, Dish Washer, Vacuum | Brand A, Brand C, Brand E |
| Provider B | San Diego | Appliance Service/Repair | Oven, Refrigerator, A/C | Brand A, Brand Z |
| Provider C | Chicago | Home Repair | Appliances, Flooring, Bath | Brand A, Brand C, Brand N |
| Provider D | San Diego | Auto Repair | Engine, Transmission, A/C, Electrnics, Exhaust | Brand P |

| SERVICES | | | | |
|---|---|---|---|---|
| APPLIANCE REPAIR | BRAND A | OVEN | CHICAGO | SOON | QUOTE |
| AUTO REPAIR | BRAND X | TRANSMISSION | MIAMI | IMMEDIATE | ACCEPT |
| APPLIANCE REPAIR | BRAND B | DISH WASHER | CHICAGO | W/MONTH | ACCEPT |
| BREAKFAST | 20 PEOPLE | CASUAL | CHICAGO | 3/14/14 | QUOTE |
| APPLIANCE REPAIR | BRAND D | HEATER | SEATTLE | SOON | CONTACT |
| LEGAL SERVICE | ESTATES/TRUSTS | WILL PREP | BOSTON | W/MONTH | CONTACT |
| FULLFILMENT | | | | | |
| PARTS | OVEN | HEATING COIL | CHICAGO | SOON | QUOTE |
| PARTS | DISH WASHER | DOOR | CHICAGO | W/MONTH | CONTACT |
| CONTRACTOR | LEGAL | WILL PREP | BOSTON | W/MONTH | ACCEPT |

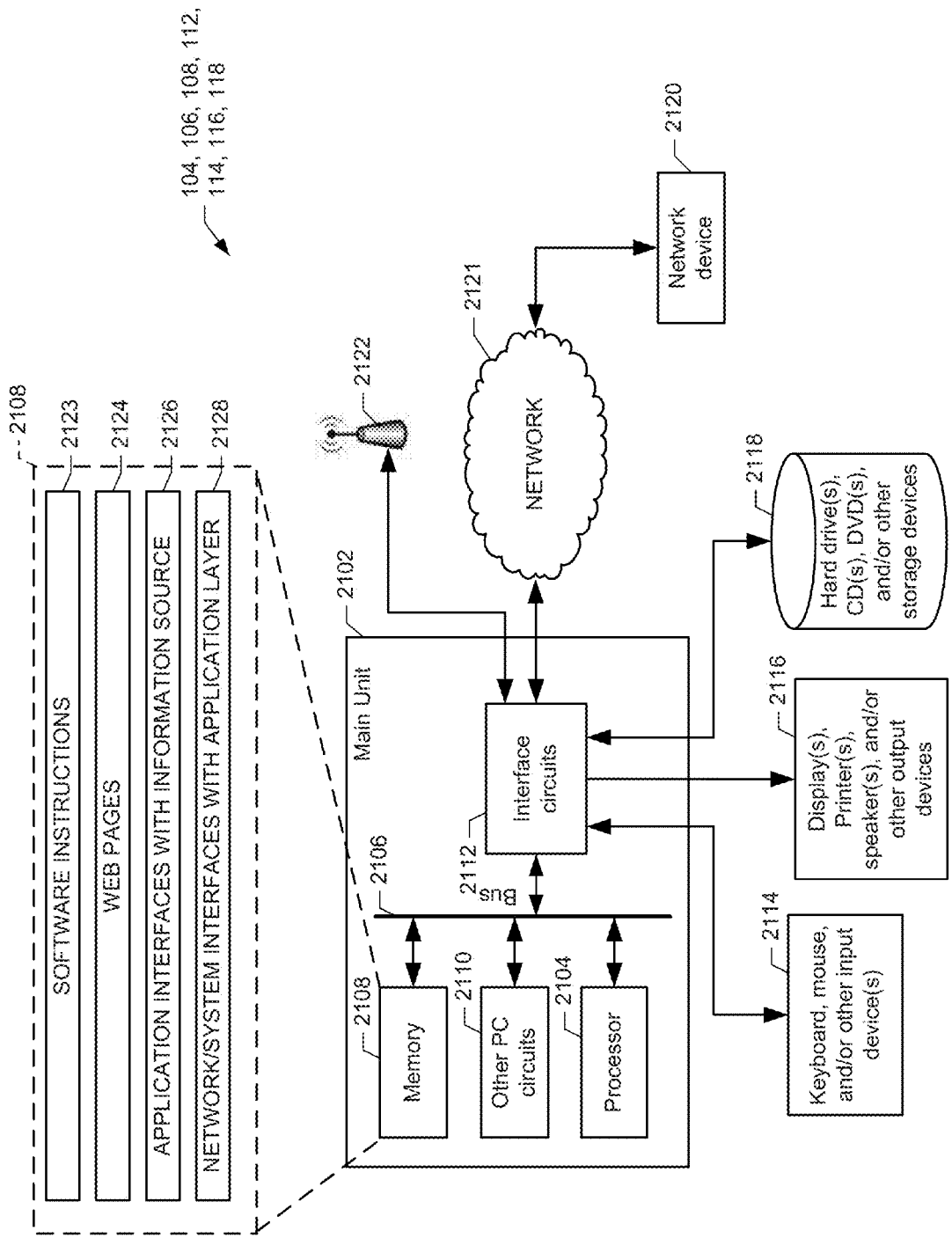

SERVICE REQUEST MANAGEMENT METHODS AND APPARATUS

PRIORITY CLAIM

The present application is a non-provisional of and claims priority to and the benefit of U.S. Provisional Application Ser. No. 61/771,707, filed on Mar. 1, 2013, the entirety of which is incorporated herein by reference.

BACKGROUND

With the ever increasing adaption of network capability to devices, components, structures, etc., the Internet of Things ("IoT") and the Internet of Everything ("IoE") are becoming more of a reality. Devices that traditionally never had an Internet connection are now (or soon will be) being integrated with Internet connectivity. These devices include, for example, large appliances (e.g., ovens, microwaves, refrigerators, washing machines, dryers, air conditioners, etc.), small appliances (e.g., microwaves, blenders, mixers, food processors, power tools, etc.), and household goods (e.g., hair dryers, electric toothbrushes, electric razors, curling irons, etc.). Network connectivity is essentially being added to any device that has an electric power source or could be easily integrated with an electric power source.

At the same time, consumers are ever increasingly becoming overwhelmed with information and data. Smartphones readily provide access from virtually anywhere to work e-mail, personal e-mail, text messages, web pages, apps, games, media, etc. Consumers are also bombarded with information from television, tablets, watches, glasses, digital advertisements, computers, and even all the newly networked devices. In essence, the amount of information digested by consumers is far more than the consumers are capable of processing and acting upon.

Both networked devices and consumers occasionally have service needs. Devices sometimes malfunction or need routine maintenance to continue operating properly. Additionally, consumers are seemingly in constant need of services for their well being, health, or enjoyment. Further, consumers are also in constant need of products such as clothing, food, and well, devices. However, many consumers do not adequately determine their product/service needs until those needs become more pressing or urgent. Consumers pay even less attention to the service needs of their devices.

SUMMARY

The present disclosure provides a new and innovative system, method, and apparatus for managing service requests for consumers and devices. An example system includes an adaptor configured to request and receive data from information sources. The example system also includes an aggregator configured to select or determine a source data model among a plurality of source data models that is associated with the information source. The aggregator is also configured to create a service data entry of the standardized service data model by applying the determined source data model to the service data. The aggregator stores the appropriate portions of the service data into data fields of the service data entry.

As described in more detail below, the source data models specify how information from the information source is to be formatted or mapped to a standardized service data model. The specially configured source data models enable the example system to retrieve and process service data from virtually any information source for which a model is created regardless of how the data is formatted or structured by the information source. The mapping of the service data models to a standardized service data model enables rules to be uniformly applied to service data.

The example system also includes a content router configured to select or determine which service providers are to receive a request for service based on service rules and the service data within the data fields of the service data entry. The content router is configured to apply service rules to service data formatted for the standardized data model to determine a specific service need and route the service need to the appropriate service providers. The service rules may be specific to device type, service type, etc. to determine a service need as accurately as possible. The example content router is configured to transmit service request messages to the identified service providers. The service request messages may include an indication of the service need and/or an indication of the service data within the data fields of the service data entry.

The example system may also include a management component that enables consumers to review service request messages sent on their behalf to service providers. The management component also enables service providers to view and/or respond to service request messages. In some embodiments, the consumers and service providers interact through the management component until an agreement is reached for service.

In addition to providing management of service requests for direct consumers, the example system may also determine service fulfillment requirements to supply service needs and transmit service fulfillment messages to the appropriate entities. In particular, the example content router may have access to fulfillment rules that specify how a service need is to be satisfied. The content router selects a fulfillment provider or other entity that is capable of fulfilling the service need of a service provider that ultimately provides a service to a consumer.

The example system, methods, and apparatus disclosed herein accordingly provide a framework that enables consumers (or devices of consumers) to effortlessly request services (or products) and enables service providers to have consumer service needs fulfilled. In this manner, the example system, methods, and apparatus disclosed herein provide an integrated consumer-to-business and business-to-business platform for the seamless management of service (or product) requests and fulfillment. The example system, methods, and apparatus disclosed herein therefore is able to satisfy the needs of consumers (and service providers) before consumers (and service providers) have time to address their needs or are even aware of their needs.

Additional features and advantages of the disclosed system, method, and apparatus are described in, and will be apparent from, the following Detailed Description and the Figures.

BRIEF DESCRIPTION OF THE FIGURES

FIG. 6 shows an example data structure that includes service data received from the information source of FIG. 2, according to an example embodiment of the present disclosure.

FIG. 7 shows an example service data model that corresponds to the example information source of FIG. 2 that provided the service data shown in FIG. 6, according to an example embodiment of the present disclosure.

FIG. 8 shows a diagram of an example generic service data model, according to an example embodiment of the present disclosure.

FIG. 9 shows an example data structure that includes service data received from another information source, according to an example embodiment of the present disclosure.

FIG. 10 shows an example diagram of another service data model, according to an example embodiment of the present disclosure.

FIG. 11 shows a diagram of another example of a generic service data model, according to an example embodiment of the present disclosure.

FIG. 17 shows a diagram of an example data structure of service provider information provided to register with the example service management system of FIG. 1, according to an example embodiment of the present disclosure.

FIG. 18 shows a diagram of a user interface that includes service requests and fulfillment requests, according to an example embodiment of the present disclosure.

FIG. 21 is a block diagram showing electrical systems of an example computing device (e.g., the information source, the device, the service management system, the adapter, the aggregator, the content router, and/or the manager of FIGS. 1 to 5).

DETAILED DESCRIPTION

Figure 1:
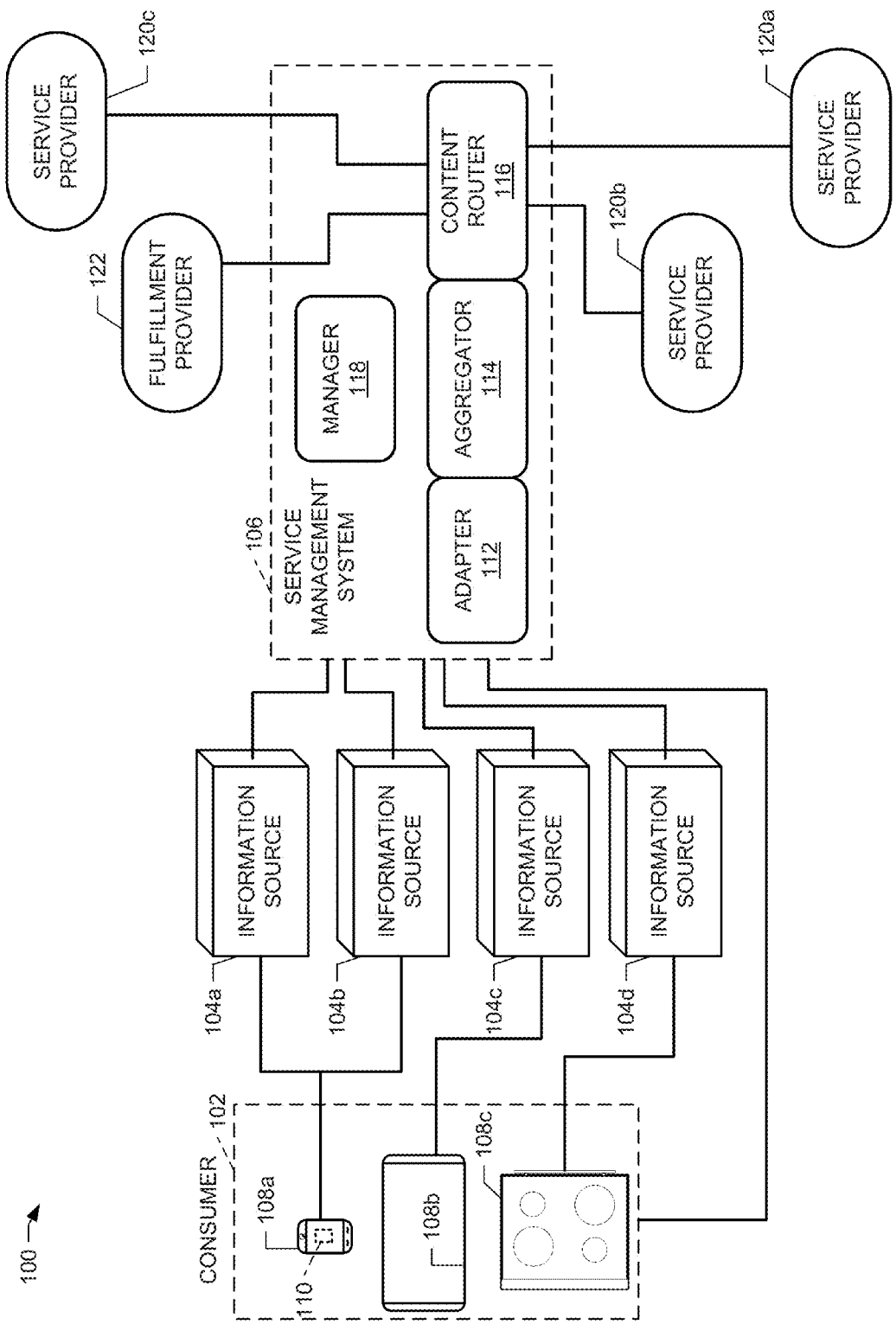
FIG. 1 shows a block diagram of an example service request environment, according to an example embodiment of the present disclosure.

The present disclosure relates in general to a method, apparatus, and system for managing service requests and, in particular, to providing a platform to determine service (or product) needs/wants prior to consumers or businesses realizing their needs/wants. Briefly, in an example embodiment, a system is described herein that receives service data from information sources. The example system applies a service data model to the service data to structure the service data into a service data entry of a uniform, standard, or generic service data model. The example system processes the service data within the standardized data entry to determine whether a service need exists and determine an appropriate service provider when a service need does indeed exist. The example system also hosts the exchange of information between service providers and consumers to finalize plans or proposals for service. In some embodiments, the example system also determines fulfillment requirements of needed/wanted services and determines corresponding fulfillment providers.

As described herein, service data is information indicative of a need and/or want of a consumer, device, etc. Service data may be present within textual data, application data, media content (e.g., video/audio), social media content, metadata, etc. Service data includes, for example, identifiers of an entity, device, etc. that needs/wants the service. Identifiers may include, for example, a model number of an appliance, a network IP address, a Media Access Control ("MAC") address, a physical location, contact information, and/or any other information that identifies what/who needs/wants a service.

Service data also includes parameters regarding the needed/wanted service. The parameters of the service data provide information regarding the nature of the service needed/wanted. The parameters may include an indication of a time/date in which the service is needed/wanted. The parameters may also include diagnostic information, part or component information, maintenance information, service type, name of a service provider, etc. It should be appreciated that the parameters could include virtually any type of information that is useful in determining a service need/want.

Service data may be generated automatically by a device (e.g., automated diagnostic reporting). In some instances, this automatically generated service data may be transmitted directly to the example system. In other instances, this automatically generated service data is transmitted to an enterprise system or application host, which processes the data for transmission to the example system. For example, a refrigerator may be configured to transmit service data (e.g., trouble codes) to a manufacturer (e.g., an enterprise system). The manufacturer processes the service data into expanded service data by translating, for example, the trouble codes into needed maintenance items (e.g., replace water filter, service compressor, etc.). The manufacturer may also add contact information (e.g., consumer contact information) and refrigerator model parameters to the service data. The example system may then access the manufacturer for the expanded service data.

The service data may also be generated by a consumer (e.g., e-mail, calendar entries, application data, etc.). The service data may be stored or managed by an application host and/or stored/processed in a device used by the consumer. In either instance, the example system is configured to retrieve this service data to determine service needs/wants of a consumer. For example, consumers may have an account with an e-mail and calendar application host. The account may be cloud-based and/or managed by servers operated by the application host. The example system accesses the account provided by the application host to retrieve service data to determine service needs/wants of corresponding consumers.

Service data may further include information that is not intended by its creator to explicitly express a need/want for service. For example, service data could include contents of e-mails and text messages. The example system analyzes the contents to determine that a consumer may need/want a service in the future based on language (e.g., terms corresponding to keywords) within the content. In a particular example, a consumer sends an e-mail to a friend with contents that includes the line "I really need get a haircut, it has been ages since the last one." The example system analyzes this information to determine that the consumer needs/wants a haircut and performs procedures described herein to determine one or more appropriate service providers for the consumer without the consumer having to actually request the service or locate service providers. Of course, the example system is only able to review and analyze personal contents of consumers with their permission and/or via registration.

As described herein, an information source is an entity, device, server, etc. that is capable of providing and/or processing service data for access by or transmission to the example system. An information source may be, for example, a smartphone, tablet computer, laptop, and/or computer of a consumer. Additionally or alternatively, the information source may include an application host or enterprise system that compiles, processes, expands upon, and/or stores service data. It should be appreciated that there is virtually no limit as to what may constitute an information source as long as the device, component, entity is capable of processing, storing, transmitting, etc. service data.

Reference is made herein to consumers. While in many embodiments, consumers are described as being individuals, consumers may also include business entities. Generally, consumers include any person, business, or organization that has needs/wants. In other words, consumers include virtually all people, businesses, and organizations. As described herein, consumers create service data. Additionally or alternatively, a consumer may possess or otherwise be associated with devices that generate service data. Moreover, a consumer may operate a business or organization that generates service data. For example, a company may maintain a log or data structure that stores needed maintenance activates of a facility. The company may only even have e-mails between employees expressing maintenance needs of the facility. The example system (with permission from the company) analyzes company records, logs, data structures, e-mails, etc. to determine, for example, the maintenance needs and contacts the appropriate service providers.

Reference is also made herein to service providers. As described in more detail below, service providers are entities that provide services (or products) to consumers. A service provider may provide a tangible service (e.g., appliance repair, home repair, grocery service, food service, personal hygiene service, etc.) and/or an intangible service (e.g., legal service, tax service, entertainment service, consulting service, etc.). There is virtually no limit as to what entity may qualify as a service provider.

Reference is also made herein to service fulfillment providers. As described below in more detail, service fulfillment providers (or fulfillment providers) are entities that enable service providers to adequately respond to service needs/wants of consumers. In other words, a fulfillment provider provides products and/or services needed by a service provider to provide a service to a consumer. For example, a service provider may repair appliances. In this example a service fulfillment provider provides replacement parts for appliances. The appliance repair service provider is dependent upon receiving replacement parts from the replacement part provider to adequately service, for example, a consumer's oven.

The example system is described herein as using service data models to convert, format, map, or otherwise structure service data from an information source into a standardized data structure (e.g., service data model). This conversion enables service data that may be formatted in different manners by information sources to be commonized for the example system. This standardization enables the example system to apply the same service rules and/or service fulfillment rules service data regardless of the information source. The example service data models may be created specifically for each information source and/or each type of service data provided by an information source. A service data model, may, for example, indicate which fields of service data for a standardized service data entry are to be populated based on locations of portions of service data at the information source. A service data model may also include definitions or references to translate or supplement some service data. For example, a service data model may include a data structure of refrigerator trouble codes for a specific manufacturer (e.g., an enterprise system information source). The service data model also includes a reference of the model numbers to a textual description of the trouble codes (e.g., compressor needs service). In another example a service data model may include a data structure of refrigerator model numbers referenced to a year and model name. The example system uses the service data model to add the year and model name to a service data entry of a standardized service data model to so that standardized rules may be applied to determine a service need/want and a corresponding service provider.

Throughout this disclosure, some of the described embodiments include reference to service requests, service needs/wants of consumers, service fulfillment. It should be appreciated that the example system described herein is also configured to determine product requests, product needs/wants, and product fulfillment. In some embodiments, products may be combined with one or more services. For instance, a grocery service may provide needed/wanted groceries to consumers.

The disclosed system may be readily realized in a service request environment. FIG. 1 illustrates a block diagram of an example service request environment 100 that includes a consumer 102, information sources 104, and a service management system 106. For brevity, only one consumer 102 is shown in FIG. 1. In other examples, the environment 100 may include a plurality of consumers 102. Further, while the consumer 102 is shown as a residential consumer, in other examples, the consumer 102 may include a business and/or organization.

The example consumer 102 includes (e.g., possesses, owns, operates) devices 108. As shown in FIG. 1, the devices include a smartphone 108a, a television 108b, and an oven 108c. In other embodiments, the devices 108 may include additional appliances, components, or anything that is capable or processing/transmitting service data. For example, the devices 108 could include a computer, processor, tablet computer, glasses, vehicles, large appliances (e.g., ovens, microwaves, refrigerators, washing machines, dryers, air conditioners, etc.) small appliances (e.g., microwaves, blenders, mixers, food processors, power tools, etc.), and household goods (e.g., printers, hair dryers, electric toothbrushes, electric razors, curling irons, etc.). In examples where the consumer 102 includes a business and/or organization, the devices 108 may include servers, manufacturing equipment, transportation vehicles, laboratory equipment, process control equipment, etc. Essentially, the devices 108 may include virtually anything that is capable of transmitting service data.

The example devices 108 are communicatively coupled to the information sources 104 and/or the service management system 106. The connection may be direct and/or may be through a network (e.g., the Internet, a powerline communication system, a cellular system, etc.). The example devices 108 may be configured to transmit service data to the information sources 104 and/or the service management system 106 without any interaction from the consumer 102. For example, the oven 108c may periodically transmit performance service data (e.g., operational hours, average temperature setting, average burner setting, etc.), functionality service data (e.g., power consumed, status of sensors, etc.), and maintenance service data (e.g., burner broken, timer inoperable, two year inspection due, etc.).

The example devices 108 may also be configured to transmit consumer provided service data to the information sources 104 and/or the service management system 106. For example, the information source 104a may host e-mail, calendar, and document processing applications in a cloud or distributive computing environment. The consumer 102 uses the device 108a to create and store information (e.g., e-mails, calendar entries, word documents, spreadsheets, blog entries, etc.) in association with the applications hosted by the information source 104a. The service data may be stored at the information source 104a, within a memory server accessible by the information source 104a, and/or at the device 108, which may be accessible by the applications hosted by the information source 104a.

The example information sources 104 include any enterprise system, application host, etc. that is configured to process, append, modify, create, service data based on, for example, service data from devices 108. As described in more detail below in conjunction with FIG. 2, the information sources 104 are configured to receive information (e.g., service data) from the consumer 102, process and store the service data in a specific format, and make the stored service data available to the service management system 106 through one or more interfaces. Through this configuration, the information sources 104 are configured to provide service data in response to requests from the system 106. However, in other embodiments, the information sources 104 may be configured to periodically transmit service information to the service management system 106.

Further, in instances where the devices 108 communicate directly (via a network) with the service management system 106, the consumer 102 and/or the device 108 itself is an information source. In these embodiments, the devices 108 may periodically transmit the service data directly to the service management system 106 (sometimes without interaction from the consumer 102). In other instances, the service management system 106 may periodically request service data (or subscribe to service data) from the devices 108. In both of these embodiments, the consumer 102 may configure the devices 108 with an endpoint address (e.g., an IP address, file transfer protocol ("FTP") server address, website address, etc.) to transmit service data to the service management system 106. Additionally or alternatively, the consumer 102 may provide the service management system 106 with addresses of the devices 108 and/or account information for accessing service data within one or more applications used by and/or operating within the devices 108.

In some embodiments, the service management system 106 may transmit an application 110 to at least some of the devices 108. The application 110 may alternatively be provided through an application provider or store. The application 110 is configured to analyze information on the devices 108 for service data and accordingly periodically transmit detected service data to the service management system 106. For example, the application 110 may be configured to analyze text messages, e-mail, application data, webpage usage, etc. for service data. The application 110 may also enable users to enter service needs/wants and transmit this service data to the service management system 106. In some embodiments, the application 110 may also access devices communicatively coupled to the device 108 to search for service data. For instance, the application 110 may be included within a server of a business. The application 110 may periodically access laboratory equipment, devices of employees, and/or manufacturing equipment for service data.

The example service management system 106 is configured to request/receive service data from the information sources 104 and process this service data to determine a service need/want and one or more service providers capable of handing the needed/wanted service. The example service management system 106 is also configured to determine fulfillment requirements of a needed/wanted service and appropriate fulfillment providers. The service management system 106 may also be configured to facilitate the exchange of information between service providers, consumers, and/or fulfillment providers. In some embodiments, the service management system 106 may host a platform that enables service providers and/or fulfillment providers to view, respond to, and/or bid on needed/wanted services.

As explained in more detail in conjunction with FIGS. 2 to 5, the service management system 106 includes an adapter 112, an aggregator 114, a content router 116, and a manager 118. The example adapter 112 is configured to use clients to request and/or subscribe to service data at information services 104. The adapter 112 is configured to interface with multiple systems using different protocols to obtain service data in different formats and/or configurations. The adaptor 112 is described in further detail in conjunction with FIG. 2.

The example aggregator 114 is configured to convert, supplement, standardize, map, or otherwise process service data from information sources into a generic or standardized format. The aggregator 114 is configured to access a service data model corresponding to the information source that provided the service data to determine how the service data is to be converted. The standardized format includes defined data fields of a data structure (e.g., a service data entry) corresponding to a generic service data model. The example aggregator 114 is described in further detail in conjunction with FIG. 3.

The example content router 116 is configured to determine a service need/want expressed within standardized service data and determine one or more service providers 120. The example content router 116 makes these determinations using a rules engine that applies active rule groups to the standardized service data to determine which of the rules are satisfied. The rules may also include linguistic maps that reference certain terms or phrases within service data to a keyword that corresponds to an indication as to whether a consumer has a service need/want and/or the type of service. The example content router 116 transmits messages to the selected service providers 120 including an indication of the needed/wanted service, a type of service, and/or service data included within the standardized data structure.

The example content router 116 is also configured to apply service fulfillment rules to service data to determine if a product/service is needed so that service providers may satisfy the need/want of the consumer. The service fulfillment rules may be specific to the needed/wanted service and/or specific to the service providers. The example content router 116 is configured to transmit messages to the selected service fulfillment providers 122 including an indication of the needed/wanted product/service, contact information of the service provider, and/or service data included within the standardized data structure. The example content router 116 is described in further detail in conjunction with FIG. 4.

The example manager 118 is configured to host or otherwise provide a platform for consumers 102, service providers 120, and fulfillment providers 122 to exchange information and finalize agreements for services and/or products. In some embodiments, the manager 118 may host a website that provides a listing of service needs/wants of customers. Any one of the service providers 120 may view the needs/wants of the customers on the website and respond through the manager 118. The response may include, for example, a quote, a promotion, a coupon, information regarding the service provider, etc. A consumer 102 may use this response information to select one of the responding service providers 120 (or a service provider that did not respond).

In another example, the manager 118 may provide a listing of fulfillment needs/wants of service providers 120. Fulfillment providers 122 (who may also be service providers 120 in certain instances) may review these needs/wants and appropriately respond. A response could include a request for more information (such as specific product name/model), bid information, delivery information, etc. The manager 118 may make the listing of available needs/wants of consumers 102 and/or service providers 120 available to any other provider 120 and/or 122. Alternatively, the manager 118 may only make the needs/wants available to subscribing providers, providers that agree to view advertisements, and/or providers that pay a fee for a specific geographic location and/or service/product category. The manager 118 is described in further detail in conjunction with FIG. 5.

Adapter

Figure 2:
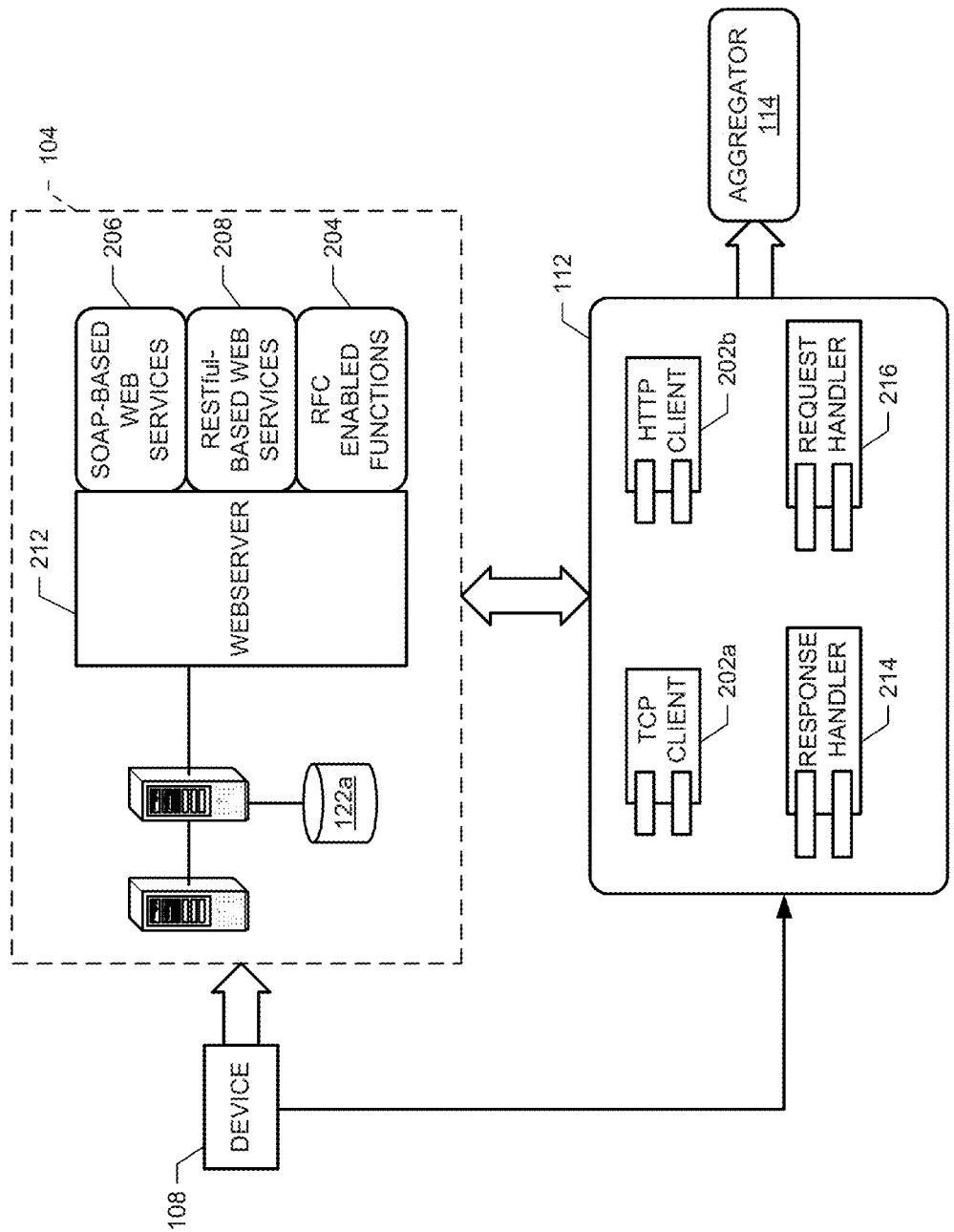
FIG. 2 shows an example diagram of an information source and an adapter of the service request environment of FIG. 1, according to an example embodiment of the present disclosure.

FIG. 2 shows a diagram of the example adaptor 112 and information system 104 of FIG. 1. In this embodiment, the adapter 112 receives service data from a source of information, which includes either the device 108 (via a network) or the enterprise system information source 104. Regardless of the source of the service data, the adapter 112 is configured to request or poll an information source (e.g., transmit an application programmable interface ("API") call) for service data and/or is configured to periodically receive service data from an information source. The adapter 112 is accordingly configured to communicate with multiple systems and/or devices regardless of protocol or interface. The example adapter 112 may use an Apache Camel programmable engine or similar engine to manage interface requests and process received service data.

The example adapter 112 is preconfigured to communicate with the information source 104 and/or the device 108. For example, a consumer 102 provides the adapter 112 with registration information including, for example device information, which the adapter 112 uses to structure requests for information or configure an application 110. The information source 104 may also provide registration information to facilitate communication with the adapter 112.

i. Communication with Information Sources

In the embodiment of FIG. 2, the example adapter 112 includes clients 202 to request, subscribe to, or otherwise poll information sources for information. The type of client 202 used by the adapter 112 is dependent upon an interface at the information source 104. In this particular embodiment, the adapter 112 includes a transmission control protocol ("TCP") client 202a to facilitate remote function call ("RFCs") communications with the information source 104. The TCP client 202a is used by the adapter 112 in instances where the information source 104 is configured with RFC enabled functions 204. These RFC enabled functions 204 are mechanisms that enable external applications (such as the adapter 112) to invoke business services/functions (e.g., SAP® business services) directly within the enterprise system information source 104.

The example adapter 112 also includes a hypertext transfer protocol ("HTTP") client 202b to facilitate representational state transfer ("REST") and/or simple object access protocol ("SOAP") communications. The HTTP client 202b is configured to create web service definition language ("WSDL") and/or web application description language ("WADL") compatible requests for information sources 104 that include SOAP-based web services 206 and/or RESTful-based web services 208. The SOAP-based web services 206 is an API that exposes a set of web services to enable external applications (such as the adapter 112) to query, subscribe, or otherwise access data. The HTTP client 202b may transmit a getServiceRequest message to the SOAP-based web services 206 to cause the information source 104 to return service data. The example RESTful-based web services 208 is an API that exposes a set of web resources to external applications (such as the adapter 112). The HTTP client 202b uses the RESTful-based web services 208 to query, access, or otherwise obtain service data that is stored as a resource at the information source 104. In other examples, the adapter 112 may include additional clients 202 based on the type of interface, data protocol, and/or data platform (e.g., Java database connectivity ("JDBC"), extensible markup language ("XML"), etc.) of the information source 104.

The example adapter 112 of FIG. 2 also includes a request handler 210 configured to invoke or manage the requests transmitted by the clients 202. The request handler 210 is configured to determine times at which requests are transmitted, destination addresses of requests, and/or which protocol to use for a request. The request handler 210 is also configured to manage retransmissions of requests in instances where a response is not received within a predetermined amount of time.

The example request handler 210 may be configured by the information source 104 and/or a consumer 102. For example, the information source 104 of FIG. 2 may provide the adapter 112 with information for accessing the appropriate interface 204, 206, and 208 to a webserver 212. The information may include, for example, an endpoint address, credentials, authentication information, encryption information, etc. The information may also include the type of interface, (e.g., RFC enabled 204, SOAP-based 206, RESTful-based 208, etc.), a time/date for transmitting requests, a number of permitted requests per time period, etc. The adapter 112 is configured to program or otherwise configure the request handler 210 with the received information.

In some embodiments, a consumer 102 may specify an account or device that transmits service data to the information system 104. The request handler 210 may transmit, for example, an API call to the information source 104 for service data specific only to that consumer. Alternatively, the request handler 210 may request all service data stored at the information source 104.

The example adapter 112 also includes a response handler 214 configured to receive service data from the information source 104. The response handler 214 may be configured to listen or otherwise prepare for incoming messages from the information source 104. The example response handler 214 is also configured to convert or transform the received messages into an internal messaging format or structure that is compatible with the aggregator 114 and/or the content router 116.

The example information source 104 of FIG. 2 is configured to receive service data from a device 108 and process this service data into a searchable and/or accessible format for external applications such as the adapter 112. The information source 104 may include an enterprise system that receives service data specific to the operation, functionality, and/or maintenance of devices 108. For example, the enterprise system information source 104 includes a manufacturer database that receives diagnostic information from appliances in consumer's homes.

In other embodiments, the information source 104 may also include an application host that receives or enables consumers to create service data within one or more applications. For example, an application host information source 104 may include an e-mail, photo sharing, and document managing host. The application host information source 104 may also include a social media host.

The example information source 104 of FIG. 2 includes a communication server 216 configured to facilitate communications with devices 108. The communication server 216 may also format inbound service data based on an internal format of the information source 104. The information source 104 further includes a management server 218 and a database 220 to manage and store service data. In instances where the information source 104 is an enterprise system, the management server 218 may convert service data from devices 108 into another format. For example, the devices 108 may transmit service data that includes diagnostic trouble codes and a model number. In this example, the management server 218 converts the trouble codes into textual service data (e.g., compressor needs repair) and/or adds consumer information based on the model number (assuming the consumer registered with the information source 104). In instances where the information source 104 includes an application host, the management server 218 is configured to operate applications (e.g., an e-mail application, calendar application, social media application) from which service data is created by a consumer.

The example database 220 is configured to store service data processed by the management server 218. The stored service data can include device information, consumer information, application information, social media information, etc. In some embodiments, the management server 218 enables users to access the database 220 to modify, remove, or create service data.

The example webserver 212 is configured to provide external applications (such as the adapter 112) access the database 220. The webserver 212 may be configured to search the database 220 so that service data appropriate to a request is transmitted to the adapter 112. For instance, the webserver 212 may verify credentials of the adapter 112. The webserver 212 may also search the database 220 for service data associated with a particular device, consumer, etc. identified in a request from the adapter 112.

It should be appreciated that the diagram of the information source 104 of FIG. 2 is only one example of an information source. In other examples, the information source 104 may include additional or few types of interfaces 204, 206, 208 and/or additional or fewer servers 216 and 218. For example, the information source 104 may include one or more servers configured to troubleshoot device issues, manage accounts with consumers, etc. Further, the servers 216 and 218, the database 220, the webserver 212 and/or the interfaces 204, 206, and 208 may be distributed within a cloud computing network.

ii. Communication with Devices

In addition to communicating with an enterprise system information source 104 or an application host information source 104, the example adapter 112 is also configured to receive service data directly from devices 108. In some examples, the request handler 210 transmits requests to the device 108 (after registration by a consumer) for service data. In other examples, the devices 108 may periodically transmit service data to the adapter 112. Moreover, the adapter 112 may provide an application 110 to the device 108 that is configured to identify and transmit service data. For example, the application 110 may operate in a background of a device 108 and record keystrokes to identify service data. The application 110 may also analyze information entered into other applications (e.g., a social media application) for service data. The application 110 may further include functionality that enables the consumer 102 to enter or request needed/wanted services by entering text into one or more data fields. The application 110 then transmits this information to the adapter 112.

In some examples, the adapter 112 may communicate with one or more devices 108 at a business or organization. These devices 108 may include an interface that enables the request handler 210 to send request messages via the appropriate client 202. The request may be routed directly to the device and/or one or more servers at the business that aggregate information from other devices (similar to the configuration of the information source 104).

Aggregator

Figure 3:
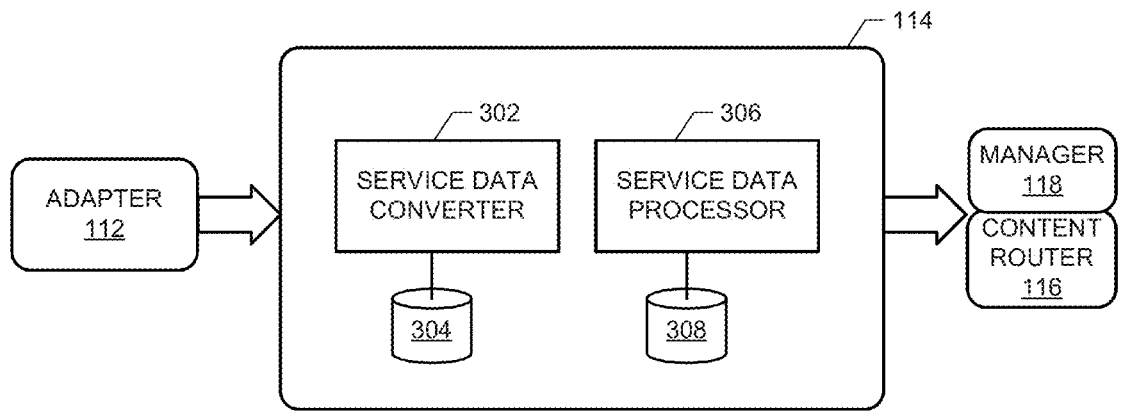
FIG. 3 shows an example diagram of an aggregator of the service request environment of FIG. 1, according to an example embodiment of the present disclosure.

FIG. 3 shows an example diagram of the aggregator 114 of FIG. 1. The example aggregator 114 is configured to receive service data from the adapter 112 and map, format, standardize this service data into a form for analysis by the content router 116. The example aggregator 114 includes a service data converter 302 to convert, format, standardize, or otherwise structure service data into one or more data fields of a service data entry of a generic service data model. The service data converter 302 is configured to use service data models stored within database 304 to determine how the received service data is to be processed. As indicated above, each service data model is specifically configured based on the information source 104 that provided the service data. The service data models may also include and/or link to data structures that include consumer reference information, device reference information, and/or any other information that may be useful and/or needed to populate data fields of the generic service data model.

FIGS. 6 to 8 show diagrams that illustrate how the example aggregator 114 operationally maps service data from an information source into a generic and/or standardized format. FIG. 6 shows an example data structure 600 that includes example service data received from, for example, the information source 104 of FIG. 2. In this example, the service data is appliance-related information that was generated by appliance-type devices 108, transmitted to the enterprise system information source 104 for processing, and transmitted to the adapter 112 upon request. To retrieve the data, the adapter 112 uses, for example, the request handler 210 and the HTTP client 202b to transmit a request for service data associated with specified consumers (e.g., consumer XYE, consumer PPO, consumer 9TG, and consumer LMK). The information source 104 may transmit one or more messages including the service data shown in FIG. 6. For example, the information source 104 may transmit a message for each data field of each line, a message for each line, or a message including all the data shown in FIG. 6. The example response handler 214 combines the data in the messages to form the data structure 600. In some instances, the adapter 112 effectively copies the data structure of the information source 104 including the requested service data. Alternatively, the adapter 112 transforms the service data into a flat file structure inclusive of the format in which the service data was created and/or stored by the information source 104.

As shown in FIG. 6, the service data from the information source 104 is organized into an incident field, a date field, a consumer identifier field, a device number field, a model number field, and a reported incident field. The example aggregator 114 is configured to identify a service data model that corresponds to the information source 104 and use the service data model to map or structure the data into a standardized or generic service data model. For example, FIG. 7 shows an example service data model 700 that corresponds to the information source 104 that provided the service data shown in FIG. 6. The service data model 700 includes a field mapper 702, consumer information 704, device information 706, device model information 708, and incident information 710.

The components 702 to 710 of the service data model 700 were created specifically to map the service data of the data structure 600 into data fields of a generic service data model 800 shown in FIG. 8. It should be appreciated that the database 304 of FIG. 3 includes a different service data model for each different information source that provides service data. This configuration enables the aggregator 114 to map or convert service data from any known format of an information source into a uniform, standardized, generic structure. In some instances, operators of the aggregator 114 may create each service data model based on information describing how service data is structured at an information source. Alternatively, the aggregator 114 may create each service data model based on information from an information source. It should be appreciated that the different service data models may have fewer or additional components compared to the service data model shown in FIG. 7.

The example service data model 700 specifics how each line or entry of the service data in FIG. 6 is to be mapped to the generic data model 800 of FIG. 8 to create a service data entry 802. Thus, in the example shown in FIGS. 6 to 8, four separate service data entries based on the generic service data model 800 are created. The example field mapper 702 includes instructions regarding which fields of the data structure 600 correspond to which data fields of the generic device data model 800. For example, the field mapper 702 includes an instruction that indicates the consumer identifier from the data structure 600 is to be stored or applied to the 'Consumer' data field of the service data entry 802 of the generic data model 800. The field mapper 702 also includes an instruction that indicates the model number from the data structure 600 is to be stored or applied to the 'Model Number' data field of the generic service data model 800.

The consumer information 704 of the service data model 700 includes consumer contact and address information. The aggregator 114 references the consumer identifiers in the data structure 600 with the consumer information 704 to determine additional service data (e.g., consumer contact information, consumer address, etc.) for the service data entry 802. The aggregator 114 applies the appropriate consumer information to the 'Consumer Contact' and 'Consumer Address' data fields of the service data entry 802. Similar to consumer information 704, the device information 706 includes information that expands on and/or augments the device number and the model information 708 includes information that expands on and/or augments the model number of the data structure 600. For example, the device information 706 may include a description of a device referenced to a device number specified in the data structure 600. The model information 7087 may include a description of a model, brand name, and/or parts list referenced to a model number specified in the data structure 600. The incident information 710 may include a description of issues, part numbers, etc. corresponding to the information included within the reported incident field of the data structure 600.

The example aggregator 114 is configured to compare the information in the data structure 600 to the appropriate components 704 to 710 specified by the field mapper 702 to accordingly populate the data fields of the service data entry 802 of the generic service data model 800. As shown in FIG. 8, the generic service data model 800 organizes service data into a hierarchical schema. This hierarchical schema is configured to correspond to a rule structure so that the content router 116 applies the appropriate rules to the corresponding levels or fields within the service data entry 802. In other embodiments, the generic service data model 800 may include a flat-file structure, a three-dimensional file structure, etc.

FIGS. 9 to 11 show processing performed by the service data converter 302 for service data from an application host information source 104. FIG. 9 shows an example data structure 900 that corresponds to a consumer e-mail account. Each line within the data structure 900 corresponds to a separate e-mail. The content field includes the contents of the e-mail (not shown for brevity).

FIG. 10 shows an example diagram of a service data model 1000 specific for the application host information source 104. The service data model 1000 includes a field mapper 1002 (similar to the field mapper 702 of FIG. 7), consumer information 1004, service type 1006, and linguistic maps 1008. The service type 1006 includes instructions for identifying parameters within the e-mail content of the data structure 600 that indicate information regarding a needed/wanted service.

It should be appreciated that consumers do not specify their needs/wants as concisely as devices. For instance, FIGS. 6 to 8 showed examples where devices 108 originated the service data based on detecting maintenance issues. Consumers on the other hand do not readily list their needs/wants. The example service data converter 302 accordingly uses service data models that are configured to analyze natural language in service data created by consumers to identify service needs/wants. As such, the service type 1006 includes instructions for parsing the contents of service data for any parameters of a service need/want. This includes, for example, instructions to search for dates, times, device model (e.g., 'Brand A oven just broke'), components ('water stopped coming out of Brand C refrigerator'), etc. The example service data converter 302 populates the appropriate data fields (e.g., 'parameters' and 'service date') based on the analysis of the service data.

Figure 12:
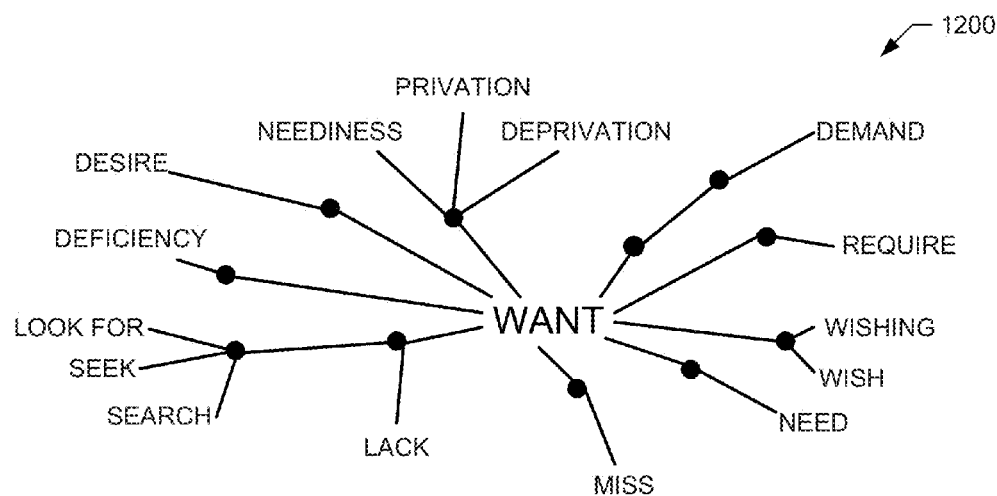
FIGS. 12 to 14 show illustrative examples of linguistic maps to determine keywords, according to an example embodiment of the present disclosure.
Figure 13:
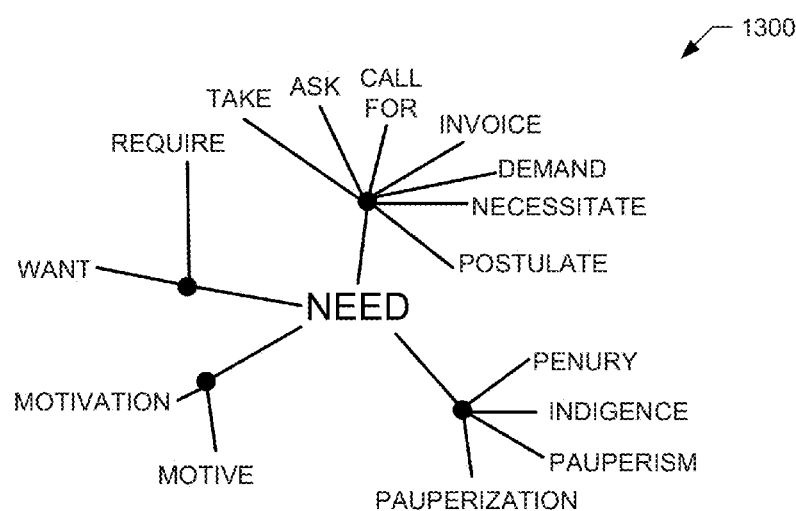
Figure 14:
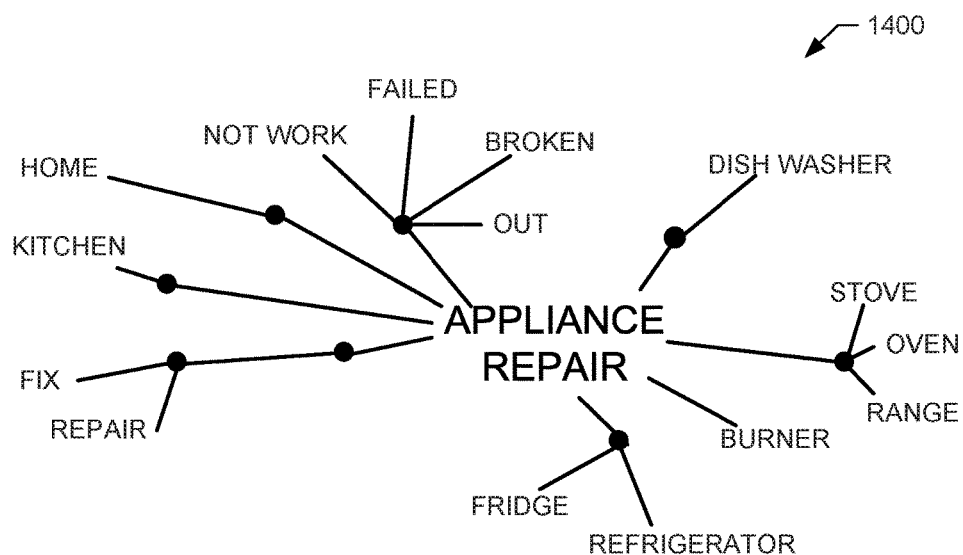

The example linguistic maps 1008 are data structures that include associations of terms or text with particular keywords of needs/wants and/or types of services. For example, FIGS. 12 to 14 show illustrative examples of linguistic maps 1200 to 1400. The linguistic maps 1200 to 1400 may be stored in the database 304 of FIG. 3. It should be appreciated that these are only examples. Other linguistic maps may include additional or fewer terms or keywords. Further, other linguistic maps may exist for other service types.

The example linguistic map 1200 of FIG. 12 associates terms with a 'Want' keyword and linguistic map 1300 of FIG. 13 associates terms with a 'Need' keyword. The inclusion of any of these terms shown within FIGS. 12 and 13 within the content section of the data structure 600 is determined by the service data converter 302 to correspond to a need/want keyword. The content router 116 uses these keywords (in addition to the service data within a service data entry) to determine if a need/want exists, a type of service, and a service provider. The service data converter 302 and/or the content router 116 may discard service data entries that do not include a want and/or need keyword.

In some embodiments, the service data converter 302 may calculate a weight for a want and/or need based on a number of times each term and/or keyword is included within content relative to the size of the content. Each term and/or keyword may also be assigned a separate weight. The service data converter 302 may determine a want/need of a consumer if a calculated weight exceeds, for example, a predetermined threshold.

The linguistic map 1400 of FIG. 14 includes terms that are associated with appliance repair. The example service data converter 302 determines which type of service is indicated by terms, phrases, and/or textual contents based on which service type linguistic map has a highest score or score above a threshold. In the example of FIG. 14, the service data converter 302 determines a score of the linguistic map 1400 based on terms, phrases, and/or other textual content in an e-mail. If the e-mail includes the terms 'broken', 'oven', 'repair', there is a greater likelihood that a consumer is in need of oven repair, or more generally, appliance repair. By comparison, the service data converter 302 may determine a lower score for home repair because while the home repair linguistic map includes 'broken' and 'repair' terms it does not include the 'oven' term. Conditioned upon identifying service need/want ketword(s) and/or service type keyword (s), the service data converter 302 stores the determined service type and/or need/want keyword(s) to the appropriate data fields of the service data entry 1102 of FIG. 11. The service data converter 302 also stores the terms, phrases, or other text associated with the keywords in the appropriate data fields of the service data entry 1102.

The example aggregator 114 of FIG. 3 also includes a service data processor 306 configured to compile and/or remove duplicate service data entries. For example, a consumer may complain about the same oven issue on social media and through e-mail (or even multiple e-mails). The service data converter 302 creates a separate service data entry for each e-mail and/or social media post. The service data processor 306 determines that some service data entries are for the same consumer with roughly the same date, and the same service need/want. The service data processor 306 accordingly removes redundant service data entries. In some instances the service data processor 306 may combine similar entries into a more complete entry (to account for instances where an e-mail may include some information and a text or post includes different information regarding the same service need/want).

The example service data processor 306 is also configured to compile service data entries per consumer, location, service need/want, etc. The service data processor 306 stores the compiled service data entries to database 308, which is accessible by the content router 116 and/or the manager 118. In some instances, the service data processor 306 notifies the content router 116 and/or the manager 118 when new service data entries are available. The compiled service data entries may be published to a webpage by the manager 118.

Content Router

Figure 4:
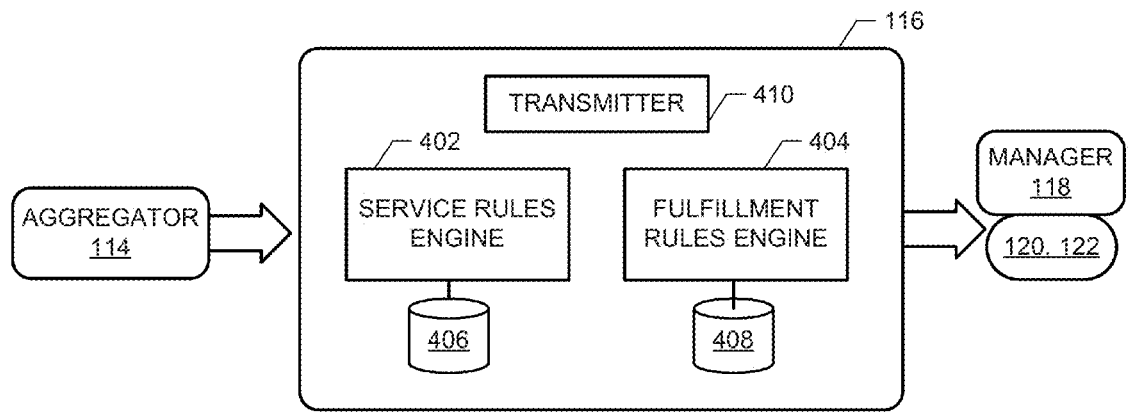
FIG. 4 shows an example diagram of a content router of the service request environment of FIG. 1, according to an example embodiment of the present disclosure.

The example content router 118 of FIG. 4 is configured to determine whether a service request and/or fulfillment request is to be transmitted to one or more service providers 120 and/or fulfillment providers 122. As discussed above, the aggregator 114 is configured to structure, augment, and/or map service data into appropriate data fields of a generic service data model. The aggregator 114 does not make a determination as to whether a service is needed/ wanted and/or a type of service. The aggregator 114 instead is configured to identify portions of service data that are indicative of needs/wants and/or types of services through the use of keyword matching via linguistic maps, data field mapping, and service data augmentation. Thus, while the aggregator 114 is configured to determine whether keywords correspond to a need/want and store this indication, the aggregator 114 does not make a service determination. The example content router 116 is configured to use the service data structured by the aggregator 114 to determine whether a service is indeed wanted/needed and the type of service. The example content router 116 is also configured to identify one or more service providers and fulfillment providers.

The content router 118 of FIG. 4 includes a service rules engine 402 and a fulfillment rules engine 404 configured to analyze service data stored in data fields of service data entries to determine service needs/wants and fulfillment needs/wants. The service rules engine 402 in particular is configured to determine whether a service is needed/wanted, a type of service, and/or a service provider to provide the service. The example fulfillment rules engine 404 is configured to determine whether a service has a fulfillment need/want and a provider to satisfy the fulfillment. Both of the engines 402 and 404 are configured to make determinations using a defined tool set that analyzes the service data structured according to generic service data model(s). The engines 402 and 404 may use a Drools business rule management system, a Smooks analysis tool, and/or any other analytics tool to determine appropriate service requests and/or fulfillment requests.

The service rules engine 402 is communicatively coupled to a service rules database 406 and the fulfillment rules engine 404 is communicatively coupled to a fulfillment rules database 408. Each of the databases 406 and 408 includes rules written in a scripting language based on the analysis tool used within the engines 402 and 404. For example, a Drools scripting language using X path notations may be used for rules when the engines 402 and 404 use the Drools rule management system.

The rules stored within the databases 406 and 408 may be organized into rule groups based on service data entries of the generic service data model(s). For example, rules may be grouped by service type, device type, etc. Such a configuration enables the engines 402 and 404 to apply rules to only the corresponding fields of the service data entries. For instance, a rule may be defined to apply to the 'Keyword' field of a service data entry. The engines 402 and 404 would accordingly only access the 'Keyword' field when applying the rule to the service data within the 'Keyword' field.

The example engines 402 and 404 determine service needs/wants, service type, and/or provider through the culmination of positive answers to the rules. For instance, the service rules engine 402 may use one or more rules to check whether service data in a 'Keyword field' is equal to 'Need' or 'Want'. A positive answer indicates that the service data corresponds to a need/want of a consumer. It should be noted that service data entries that correspond to service data generated automatically by devices 108 in need of maintenance may have a need/want indicator added by the aggregator 114 upon determining the service data originated from such devices.

The service rules engine 402 may also use one or more rules to check whether service data or a service type keyword within one or more data fields is equal to one or more service types. A positive answer to at least one of the rules is indicative of the service type. The service rules engine 402 may use a weighting scheme if there are two or more conflicting indications of service types to determine a most likely needed/wanted service.

Figure 15:
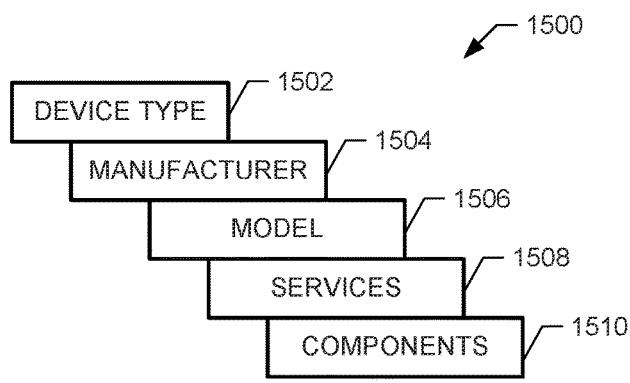
FIG. 15 shows a diagram of an example rule set, according to an example embodiment of the present disclosure.

FIG. 15 shows a diagram of an example rule set 1500. As shown in FIG. 15, the rule set 1500 is hierarchical to correspond to the hierarchical nature of, for example, the generic service data model 800 of FIG. 8. The service rules engine 402 uses the 'Device Type' rules 1502 in conjunction with the service data within the 'Device' field of the service data entry 802 to determine a device type that needs service. Similarly, the service rules engine 402 uses the 'Manufacturer' rules 1504 in conjunction with the service data within the 'Manufacturer' field of the service data entry 802 to determine a manufacturer of a device that needs service. Likewise, the service rules engine 402 uses the rules 1506 to 1510 in conjunction with the corresponding fields of the service data entry 802 to determine a model that needs service, a type of service needed, and components that may be needed to complete the service. In some instances, the lower level rules may be adjusted based on top level answers. For example, if the service rules engine 402 determines that the 'Device Type' rule 1502 produces a positive answer for an oven, the check of manufactures may be limited to only manufacturers that produce ovens. Then, if the service rules engine 402 determines that the 'Manufacturer' rule 1504 produces a positive answer for Brand A, the check of models may be limited to only models made by Brand A.

Figure 16:
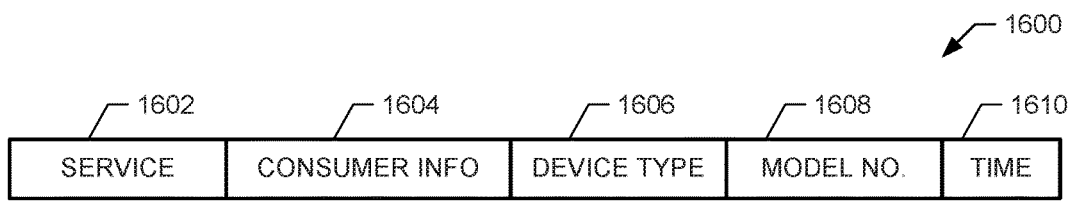
FIG. 16 shows a diagram of an example service request created by the content router of FIG. 4 based on results from service rules, according to an example embodiment of the present disclosure.

The example engines 402 and 404 are configured to create a service request based on the positive answers from applying the service and fulfillment rules. For example, FIG. 16 shows an embodiment of a service request 1600 created by either of the engines 402 and 404 based on results from applying the appropriate rules. The service request includes fields for a service type 1602, consumer information 1604, device type 1606, model number 1608, and time 1610. The service type field 1602 may include a general service type (e.g., appliance repair) corresponding to matching service type keywords and/or more specific information, such as the types of issues based on which rules returned positive answers for service type. In this example, the service request is for a consumer and the service rules engine 402 accordingly adds consumer information from the appropriate 'Consumer' data fields of the service data entry. In other examples, a fulfillment request may include contact information for the one or more service providers selected to provide the service.

The example engines 402 and/or 404 are configured to determine which service providers 120 are to receive service requests by comparing the service data within the service request to a data structure of service provider and/or fulfillment provider information. The data structure of service provider information is stored in database 406 and the data structure of fulfillment provider information is stored in database 408.

FIG. 17 shows a diagram of an example data structure 1700 of service provider information. The information may be provided by service providers that register with the service management system 106. Alternatively, the information may be obtained automatically by scanning webpages and other sources of data that include service provider information. As shown in FIG. 17, the data structure 1700 includes fields for service provider name (and/or contact information), location, services offered, devices serviced, and brands serviced. In other examples, the data structure 1700 may include additional or fewer fields. Further, the database 406 may include a data structure for each type of service search, each geographic location, etc.

To determine a service provider, the example service rules engine 402 compares the service data in the service request 1600 to service provider information fields within the data structure 1700. Alternatively, the service rules engine 402 selects a service provider based on positive answers from the rules. In this manner, the data structure 1700 is representative of positive answers of the service rules. For example, the service rules engine 402 selects Provider A if a rule returns a service type of 'appliance service' or 'appliance repair', a rule retunes a device type of 'oven', 'refrigerator', 'washer', 'dryer', 'dish washer', or 'vacuum', and a rule returns a brand of 'Brand A', 'Brand B', or 'Brand E'. The service rules engine 402 may further select service providers based on geographic location based on consumer information.

The service rules engine 402 may select more than one service provider. For instance, more than one service provider may correspond to positive answers from the same rules. In these instances, the service rules engine 402 instructs a transmitter 410 to transmit a service request message to the selected service providers. The service rule engine 402 also provides the transmitter 410 with, for example, the service request 1600 and/or additional service data from the data fields of the service data entry. The transmitter 410 accordingly creates service requests messages and transmits the messages to the appropriate service providers.

The example fulfillment rules engine 404 is configured to determine fulfillment parameters and/or a fulfillment provider after the service rules engine 402 determines where a location for a needed/wanted service. The fulfillment rules engine 404 uses fulfillment rules included within the fulfillment database 408. In some instances, the fulfillment database 408 may be integrated with the service rules database 406 such that the fulfillment rules are a subset of the service rules.

The example fulfillment rules engine 404 is configured to use the fulfillment rules to determine positive answers based on the service data (including keywords) within the data fields of a service data entry. In some instances, the fulfillment rules engine 404 uses at least some of the same service data used by the service rules engine 402. The fulfillment rules engine 404 may also use service data not analyzed by the service rules engine 402. For example, the fulfillment rules engine 404 may, for example, use rules for manufacturer, device type, and components. In addition, the fulfillment rules engine 404 may also use rules for component types, repair parts, staffing levels, opening times, etc.

Based on positive answers from applying the fulfillment rules to the service data, the example fulfillment rules engine 404 creates a fulfillment request including at least some of the service data. The fulfillment rules engine 404 also determines a fulfillment provider similar to how the service rules engine 402 determines a service provider. For instance, each fulfillment provider may provide contact information, repair parts supported, services offered, etc. After determining one or more fulfillment providers, the fulfillment rules engine 404 instructs the transmitter 410 to transmit fulfillment request messages including at least some of the service data relevant to the fulfillment to the selected fulfillment providers.

It should be appreciated that the fulfillment provider does not necessarily have to be within the same geographic location as the service provider and/or the consumer receiving the service. Further, while the fulfillment rules engine 404 was described in conjunction with repair parts, the fulfillment rules engine 404 may use rules to determine other fulfillment requirements such as staffing levels, opening times, etc. for employees, contractors, or other individuals that will be used by a service provider to provide a service. In some instances, the fulfillment rules engine 404 and the service rules engine 402 may select the same provider to provide a service and provide the fulfillment of the service. In these instances, a single request message may be sent or separate service request and fulfillment request messages may be sent.

Example Embodiments

The following four embodiments provide examples as to how the adapter 112, the aggregator 114, and the content router 116 operate to determine a needed/wanted service, service provider, fulfillment need/want, and a fulfillment provider. It should be appreciated that the examples are meant to be non-limiting to illustrate how the adapter 112, the aggregator 114, and the content router 116 operate. The example adapter 112, aggregator 114, and content router 116 may operate similarly for other types of products and/or services.

i. Refrigerator Embodiment

A consumer 102 of a refrigerator device 108 registers the device with the service management system 106. The consumer 102 provides, for example, contact information and information identifying the refrigerator device 108 such as brand and a part number. The consumer 102 may also indicate that service requests do not need to be reviewed prior to being transmitted to service provider(s). In other words, the consumer 102 agrees beforehand to accept the services of a service provider in regards to maintenance for the refrigerator device 108.

The example refrigerator device 108 is configured to create service data based on performance, functionality, and maintenance. The refrigerator device 108 is part of the IoE and manages diagnostic information regarding components using sensors and feedback processes. In this embodiment, the refrigerator device 108 determines that a filter needs to be replaced, a compressor has an overcurrent issue, a light bulb has burnt out, and coils are due for a cleaning. The refrigerator device 108 is configured to transmit generated service data periodically to a manufacturer (e.g., an enterprise system information source 104). In this instance, the refrigerator device 108 generates and transmits diagnostic codes corresponding to the filter replacement, the overcurrent compressor issue, the burnt out light bulb, and the coil cleaning. The manufacturer translates these diagnostic codes into textual service issues stored in a database.

The adapter 112 uses, for example, the request handler 210 and the HTTP client 202b to transmit an API call to the manufacturer. The API call includes an identifier of the refrigerator device 108 and/or the consumer 102. In response to the API call, servers at the manufacturer identify the service data associated with the refrigerator device 108 and transmit this service data to the adapter 112. The example adapter 112 structures the received service data in a format for processing by the aggregator 114.

The example aggregator 114 maps, converts, augments, standardizes, or otherwise formats the service data into data fields of a service data entry of a generic service data model. The aggregator 114 determines that the service data was automatically generated by the refrigerator device 108 and accordingly adds a need/want keyword. In regards to services, the aggregator 114 uses linguistic maps to determine appliance repair and/or refrigerator repair as keywords. The aggregator 114 also augments the information regarding the consumer 102, the type of refrigerator device 108, and/or the filter type/light bulb type, compressor type, and coil type. The aggregator 114 stores the newly standardized service data to the database 308 of FIG. 3.

The example content router 116 applies rules to the generic or standardized service data. For example, the content router 116 uses keyword rules to determine a need/want exists and that the needed/wanted service type is appliance repair. The content router 116 also uses applied rules to determine the brand and refrigerator type in conjunction with the brands of the parts that need service (compressor and coils) and the parts that need replacement (filter and light bulb). The content router 116 then determines one or more service providers 120 within vicinity of the consumer 102 that are capable of preforming the service and accordingly transmits service request messages including at least some of the service data.

The example content router 116 also determines that the appliance service has a fulfillment need/want corresponding to the replacement parts. The content router 116 applies fulfillment rules to identify the brand and/or type of replacement parts (filter and light bulb) and determines which fulfillment providers 122 are capable of providing these parts. The example content router 116 then transmits fulfillment request messages to the selected fulfillment providers. The consumer 102 accordingly receives service on the refrigerator device 108 without realizing that the refrigerator device 108 needed service and without having to find and contact a service provider and/or fulfillment provider.

ii. Auto Service Embodiment

In this embodiment, a consumer 102 has a smartphone device 108 that includes the application 110, which is configured to receive service requests. The consumer 102 uses the smartphone device 108 to enter the phrase, "my car needs a new starter", (e.g., service data) into a text field provided by the application 110. After entering the phrase, the application 110 may determine more information is needed and prompts the consumer 102 for a make/model/year of the car. Alternatively, the application 110 may transmit the phrase 110 (including an identifier of the consumer 102) to the adapter 112.

The example adapter 112 converts the phrase into a messaging format compatible with the aggregator 114, which then converts or maps the phrase into data fields of a service data entry of the generic service data model. The content router 116 determines that the service data corresponds to an auto repair service type and selects the appropriate service providers. The content router 116 also determines that a starter is needed to fulfill the service request and according transmits a fulfillment request to appropriate fulfillment providers. The service provider and/or fulfillment provider may then follow up with the consumer regarding the make/model/year of the car.

In an alternative embodiment, the content router 116 may determine that not enough information was provided by the user to make an appropriate determination for the service providers and/or fulfillment providers. The content router 116 may transmit a message to the application 110 prompting the consumer 102 regarding the make/model/year of the car that needs a starter. The prompt may include service data from the original request by the user. In response, the consumer 102 providers the make/model/year, which is routed through the adapter 112 and/or aggregator 114 to populate the appropriate data fields. The content router 116 then uses this new information to determine service providers and/or fulfillment providers.

In yet another embodiment, the consumer 102 may post to a social media account that her car needs a new starter. The application host information source 104 of the social media account provides the adapter 112 access to the posted service data. The adapter 112, aggregator 114, and the content router 116 then process the service data in a similar manner as the service data entered into the application 110.

iii. Office Supplies Embodiment

In this embodiment, the consumer 102 is a business. The consumer 102 possesses a service management system to track inventory of business supplies. The service management system may be hosted by a server operated by the business or a third-party provider. In this example, a business employee updates the inventory tracking system to indicate paper supplies and a printer are needed (e.g., service data). The employee may indicate the type and amount of paper. The employee may also indicate a type and brand of printer.

The example adapter 112 transmits an API call to the server of the business. In return, the server at the business consumer 102 transmits one or more messages including the service data. The adapter 112 formats the received service data into a format for the aggregator 114, which then maps, augments, or otherwise structures the service data into data fields of a service data entry. The content router 116 determines that an office supply service is needed and accordingly determines office supply service providers. The content router 116 also transmits one or more messages to the determined service providers including the paper and printer information. The content router 116 may also determine fulfillment providers (e.g., distributors and/or wholesalers) that provide paper and/or printers and accordingly transmit fulfillment request messages.

In this embodiment, the service provider may work with the business to select an appropriate printer model. The service provider may transmit a message to the manager 118 indicating the new printer model selected. The manager 118 sends the information to the aggregator 114, which updates the appropriate data fields. The content router 116 may then update the selected fulfillment providers with the new printer model and/or select different fulfillment providers capable of providing the newly selected printer model. It should be appreciated that in this example, the adapter 112, the aggregator 114, and the content router 116 automatically detect a need/want of the business and accordingly select/determine and contact providers to satisfy the need/want without any direction or effort by employees of the business (other than expressing the need/want through the inventory management system and determining a printer model).

iv. Café Embodiment

In this embodiment, a group of people (e.g., consumers 102) are attending a conference at a hotel. The example adapter 112 transmits API calls to application host information sources 104. Among the information received are calendar entries, e-mails, and/or social media posts by conference participants including information regarding the conference. The adapter 112 receives the service data and the aggregator 114 maps the service data into appropriate data fields of service data entries. It should be appreciated that each service data entry is not necessarily identical because each of the conference participants may only provide a certain amount of information about the conference. However, all of the participants have provided an indication of the conference, which the content router 116 uses to compile the similar service data entries. The content router 116 is also configured to analyze the data fields to construct a summary or aggregate data entry including a number of the different conference participates from which service data was obtained.

The example content router 116 applies service rules to determine, for example, a start time, location, and type of conference. The content router 116 also applies rules that determine the participants may want/need breakfast before the conference starts and accordingly determines service providers (e.g., cafés, restaurants, etc.) that provide breakfast within close vicinity of the conference and/or where the participants are staying. The content router 116 creates service request messages for the determined service providers indicating the number of participants, estimated time of service based on the conference time, and any other service data information that may use useful to the service providers.

The example content router 116 also uses fulfillment rules to determine supplies for the service providers to adequately host the conference participants (i.e., consumers 102) for breakfast. For example, the fulfillment rules may return positive results regarding pastries, doughnuts, cups, and plates. The content router 116 determines fulfillment providers capable of providing the supplies and according transmits fulfillment requests messages.

The example content router 116 may also determine a staffing level and/or operating hours from the service providers and accordingly notify employees regarding a work schedule. The content router 116 may transmit messages to appropriate employees regarding the work schedule. In this manner, the example adapter 112, aggregator 114, and content router 116 determine future business needs and accordingly schedules providers and/or employees to attend to these needs without significant (or any) input from the business operator. It should be appreciated that the scheduling of employees is considered part of a fulfillment service. However, in other examples, scheduling of employees may be part of a service provider determination.

Manager

In addition to determining and contacting service providers, the example service management system 106 of FIG. 1 is configured to manage service requests and/or fulfillment requests. The service management system 106 may also host a marketplace that enables service providers and/or fulfillment providers to view requested services and/or fulfillment items. To provide these features, the service management system 106 includes the manager 118.

Figure 5:
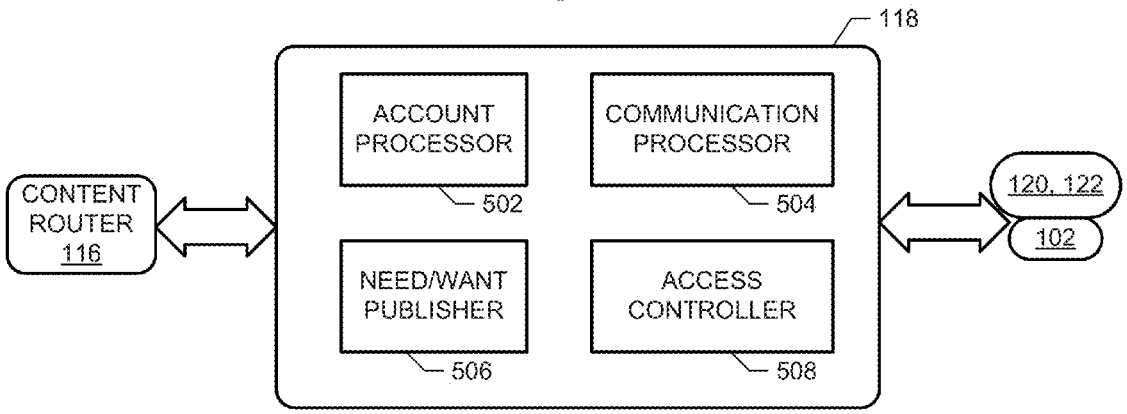
FIG. 5 shows an example diagram of a manager of the service request environment of FIG. 1, according to an example embodiment of the present disclosure.

FIG. 5 shows a diagram of the example manager 118 of FIG. 1. As shown, the manager 118 includes an account processor 502, a communication processor 504, a request publisher 506, and an access controller 508. In other examples, the manager 118 may include other components or fewer components based on the amount of functionality provided by the service management system 106.

The example account processor 502 is configured to register consumers 102, information sources 104, service providers 120, and/or fulfillment providers 122 with the service management system 106. The account processor 502 may operate or host a website or web form that prompts consumers 102, information sources 104, service providers 120, and/or fulfillment providers 122 for information. For example, the account processor 502 may prompt consumers 102 for contact information, address information, and information regarding devices 108 and/or accounts of applications operated by application hosts. The account processor 502 may prompt information sources 104 for information as to how APIs are to be accessed and/or information describing how service data is structured. The account processor 502 may prompt providers 120 and 122 for services/products offered/supported, contact information, and/or brands supported. The information obtained from the account processor 502 is used, for example, within the data structure 1700 of FIG. 17, within the service data model 700 of FIG. 7, and/or by the request handler 210 of FIG. 2.

The example communication processor 504 is configured to facilitate messages between consumers 102 and providers 120 and 122. For example, the content router 116 may send service request messages to service providers without consumer contact information. The service providers may contact consumers by responding to the request, which is routed to the communication processor 504. After receiving the response, the communication processor 504 routes the message to the consumer 102 and routes any response from the consumer back to the service provider. The communication processor 504 enables consumers to have their contact information remain anonymous in regard to the providers. In other embodiments, the service request message may include consumer contact information enabling the service providers 120 to contact a consumer through the manager 118 and/or outside of the service management system 106. The communication processor 504 also provides a framework for consumers to connect to service providers utilizing the service data managed by the service management system 106.

The example communication processor 504 may also transmit messages to other service providers that received the same request message indicating that one of the service providers has already agreed to provide the service and/or that the service is no longer needed. In some instances, the communication processor 504 may transmit a rejection message to a responding service provider when a service has already been provided, scheduled to be provided by another service provider, and/or no longer needed by the consumer (e.g., a consumer may send a message to the manager 118 indicating a particular service is not needed). In other instances, the communication processor 504 may disable a respond function within a request message after a service is not longer available for a service provider to accept.

The example request publisher 506 is configured to operate and/or host a framework for providing a marketplace that enables needs/wants of consumers 102 to be posted (rather than directly submitted) and enables providers 120 and 122 to respond to the requests. The content router 116 may post a service request or fulfillment request to a marketplace rather then send direct messages per direction from a consumer 102. For example, a consumer 102 may indicate that all requests associated with home improvements are to be posted while all requests associated with appliance repair are to be sent directly to the service providers.

To manage the marketplace, the example request publisher 506 operates a webpage that displays service and/or fulfillment requests. As mentioned, the information for the requests is provided by the content router 116 and includes service data within data fields of service data entries. The request publisher 506 also manages responses to the published requests and any follow up information provided by the consumers 102 and/or providers 120 and 122. The request publisher 506 may also operate an API that enables external applications to pull the service and/or fulfillment requests to their own websites. For example, Amazon® Marketplace, Etsy™, Craigslist™, 0Bids™, eBay®, Priceline®, Facebook®, Angie's List™, etc. may provide a feature that enables users of their websites to view and respond to service and/or fulfillment requests.

FIG. 18 shows a diagram of a user interface 1800 that includes service requests 1802 to 1812 and fulfillment requests 1814 to 1818. In other examples, separate user interfaces may be created just for service requests and fulfillment requests. It should be appreciated that the format shown in FIG. 18 is non-limiting as to the different formats available for rendering and displaying requests in a user interface. It should also be appreciated that in other examples, the user interfaces may be specific (or filterable) for a service type, product type, geographic location, consumer, etc.

As shown in the example user interface 1800 of FIG. 18, service requests 1802 to 1812 include service data including service type, brand information of a device that needs service, device type, geographic location, and a time when the service is needed. The service data also includes any additional information that may be relevant to the request. For example, the service request 1808 for breakfast service indicates that 20 consumers are seeking a casual breakfast on Mar. 14, 2014 in Chicago.

The user interface 1800 also includes an action data field (e.g., Accept, Quote, Contact) that a service provider may select to respond to the service request. For example, a service provider may select a quote action, which causes the request publisher 506 to provide a web form for appropriate quote information (e.g., price, timeline, business information, referrals, etc.) that is returned to a consumer. A service provider may select an accept action, which causes the request publisher 506 to indicate to a consumer that the service request has been accepted. The service provider may also select a contact action, which causes the request publisher 506 to provide information for contacting the consumer. The request publisher 506 may remove service requests from the interface 1800 after a service provider and consumer agree to service, after a time period from the posting of the request, and/or after a service provider has agreed to provide service.

The example fulfillment requests 1814 to 1818 corresponds to fulfillment needs of service providers. For example, the service request 1802 requests appliance repair for an oven while the fulfillment request 1814 requests one or more parts for the oven repair. In a similar manner, the fulfillment request 1818 for a legal contractor corresponds to the service request 1812 for legal services. The example content router 116 generates each of the requests 1814 to 1818 responsive to determining a service need/want and the corresponding fulfillment needs of that service. It should be appreciated that a fulfillment provider 122 may accept, quote, contact a service provider regarding a fulfillment request prior to a service provider 120 responding to a consumer.

The example request publisher 506 may also enable a consumer 102 to view all (or substantially all) service requests associated with that consumer. For example, the request publisher 506 may provide an interface or webpage that displays or provides indications as to which requests are outstanding, which requests have been responded to by a service provider, and/or which requests have been fulfilled. The request publisher 506 may also indicate which service providers received a service request. The interface may further display service provider response information including, for example, quote information. It should be appreciated that this information may also be transmitted and displayed by the application 110 on a device 108 used by the consumer 102.

The example request publisher 506 may maintain a data structure of service providers that have provided service to a consumer, which is used by the content router 116 to select service providers for similar service requests associated with the consumer. The content router 116 may also use this information to select service providers for other consumers with similar service needs, demographics, etc. In this manner, the service manager system 106 may be adaptive to service data based on previous matches and/or acceptances of service providers.

The example access controller 508 of FIG. 5 is configured to determine which consumers 102 and/or providers 120 and 122 may view which requests. For example, the access controller 508 may grant access to all requests for subscribed providers 120 and 122. However, the controller 508 may manage subscriptions so that unregistered providers 120 and 122 may view limited requests for a subscription fee. A provider 120 and 122 may pay a fee per geographic location (e.g., zip code, postal code, city, state, country, etc.), service type, fulfillment need, etc.

The example access controller 508 may also determine an access level of a consumer 102 and/or provider 120 and 122 and determine advertisements to display within, for example, the user interface 1800 of FIG. 8. For example, the access controller 508 may cause no advertisements to be displayed for registered consumers 102 and/or providers 120 and 122. However, the access controller 508 may cause at least some advertisements to be displayed within the user interface 1800 for unregistered consumers 102 and/or providers 120 and 122. In some instances, the advertisements may be associated with registered providers 120 and 122 and/or be associated with at least some of the requests displayed within the interface 1800. In some embodiments, the access controller 508 may restrict unregistered providers 120 and 122 from viewing any of the requests.

Flowchart of the Example Process

Figure 19:
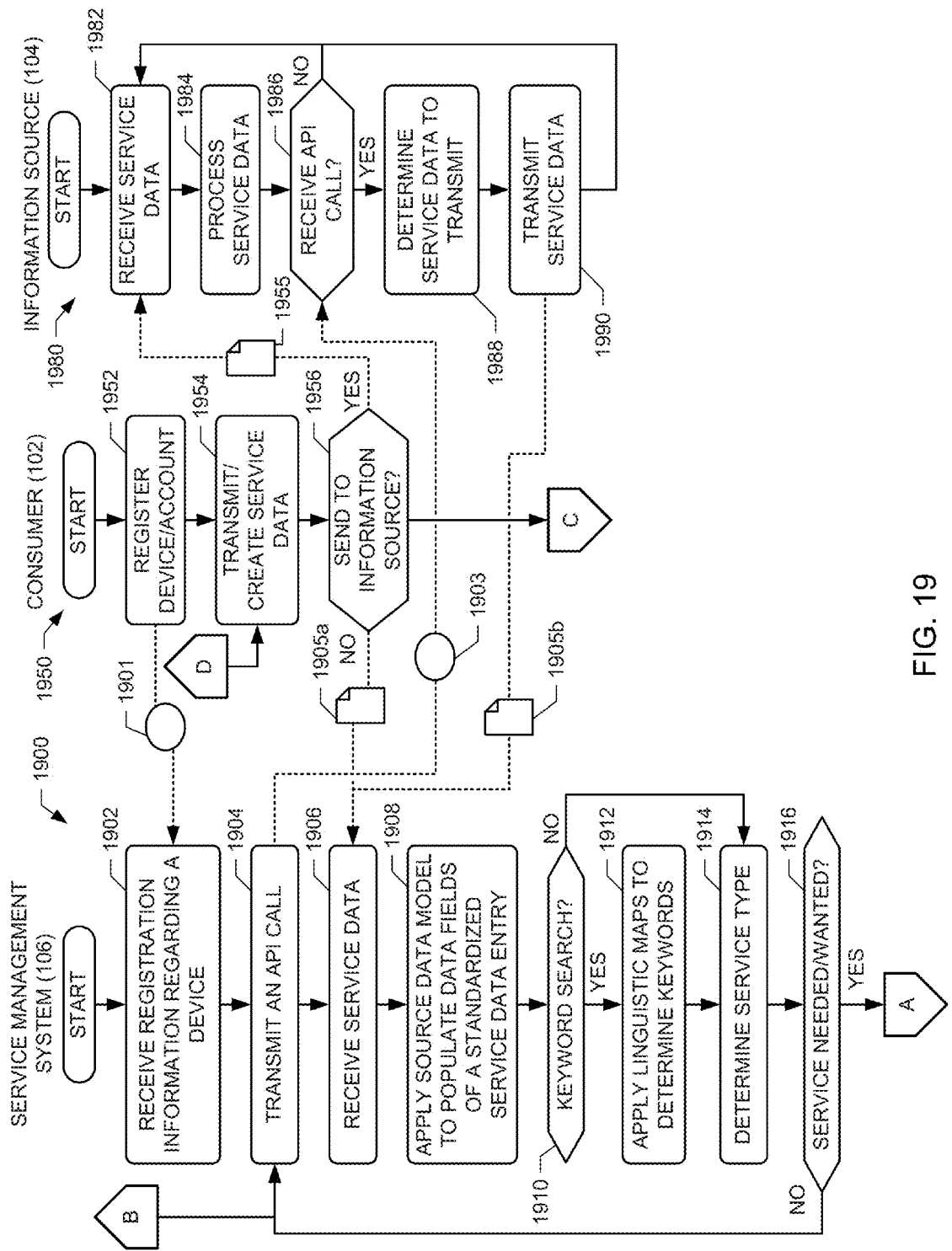
FIGS. 19 and 20 show a flow diagram illustrating example procedures to determine service needs/wants of consumers and corresponding fulfillment requirements, according to an example embodiment of the present disclosure.
Figure 20:
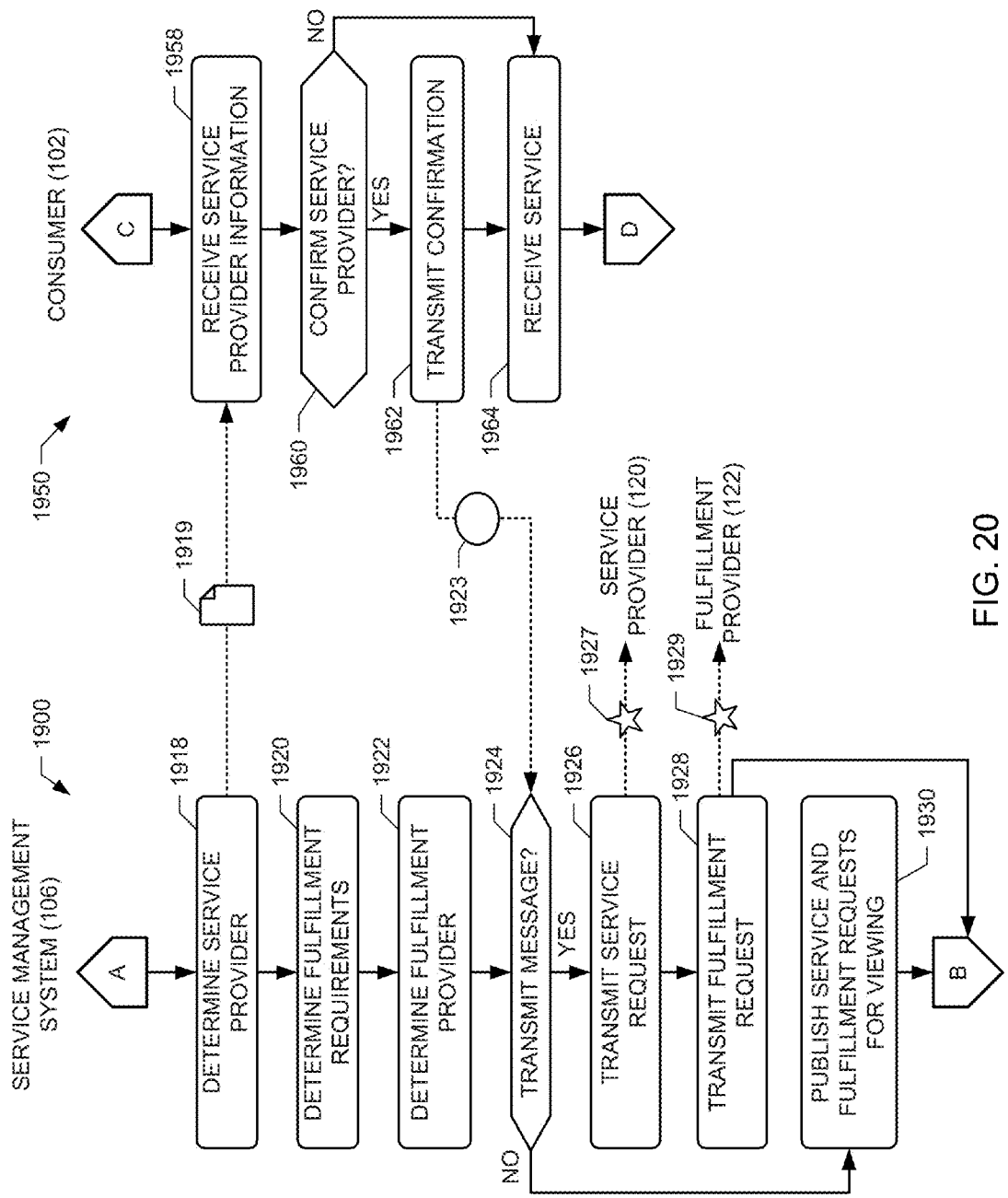

FIGS. 19 and 20 illustrate flow diagrams showing example procedures 1900, 1950, and 1975 to determine service needs/wants of consumers and corresponding fulfillment requirements based on service data, according to an example embodiment of the present disclosure. A non-transitory machine-accessible device may have instructions stored thereon that are configured when executed to cause the machine to at least perform the example procedures 1900, 1950, and 1975. Although the procedures 1900, 1950, and 1975 are described with reference to the flow diagram illustrated in FIGS. 19 and 20, it should be appreciated that many other methods of performing the steps associated with the procedures 1900, 1950, and 1975 may be used. For example, the order of many of the blocks may be changed, certain blocks may be combined with other blocks, and many of the blocks described are optional. Further, the actions described in procedures 1900, 1950, and 1975 may be performed among multiple devices including, for example the adapter 112, the aggregator 114, the content router 116, the manager 118, the information sources 104, and/or the devices 104.

The example procedure 1900 of FIGS. 19 and 20 operates on, for example, the adapter 112, the aggregator 114, the content router 116, and the manager 118 (collectively the service management system 106) of FIGS. 1 to 5. The procedure 1900 begins when the service management system 106 receives registration information 1901 from a consumer 102 regarding at least one device 108 and/or an account (block 1902). The registration information 1901 may include, for example, consumer information, device information, an endpoint address, account access information, permissions to access service data, etc. After receiving the registration information 1902, the example service management system 106 transmits an API call (or other request) 1903 for service data (block 1904). As shown in FIG. 19, the API call 1903 is transmitted to an information source 104, per the registration information 1901. In other examples, the API call 1903 may be transmitted to a device 108 of the consumer 102.

The example procedure 1900 continues when the service management system 106 receives service data 1905 from either a device 108 of the consumer 102 or the information source 104 (block 1906). As discussed above, the service data includes any information that is (or could be) indicative of a service need/want. After receiving the service data 1905, the example service management system 106 applies a source data model to the service data 1905 to populate data fields of a service data entry of a standardized service data model (block 1908). As discussed above, the service management system 106 selects a source data model that corresponds to the information source 104.

The example service management system 106 next determines whether a keyword search is to be performed (block 1910). The service management system 106 makes this determination based on the type of service data within the data fields. For example, the service management system 106 may determine a keyword search is not necessary if the service data is from a maintenance request automatically generated by a device 108 because the expression of the need/want and the type of service is explicitly included within the service data. In other words, the device 108 would not create service data if there is no need/want (e.g., if service is not needed). On the other hand, the service management system 106 determines a keyword search is necessary if at least some of the service data includes terms, text, or phrases from a consumer (e.g., e-mail content, calendar content, social media content, etc.).

Conditioned on a keyword search being necessary, the example service management system 106 applies one or more linguistic maps to terms, phrases, or other text to determine keywords (block 1912). The example service management system 106 then determines a need/want and/or a service type based on the determined keywords (block 1914). Additionally, if the keyword search is not necessary (block 1910), the example service management system 106 determines a needed/wanted service type based on the service data within the data fields of the service data entry (block 1914). In either instance, the service management system 106 determines a service type using service rules, as described above. The example service management system 106 may also determine if a service is indeed needed/wanted (block 1916). If a service is not needed (e.g., the service data does not correspond to a need/want keyword), the example service management system 106 does perform steps to determine a service provider and accordingly returns to requesting/receiving service data (block 1904).

If a service is needed/wanted, the example service management system 106 uses service rules to determine one or more service providers 120 to provide the needed/wanted service (block 1918). The example service management system 106 may transmit a message 1919 to a consumer including identifiers of the determined service providers. A consumer may use this information to approve the service providers and/or contact the service providers.

The example service management system 106 also uses fulfillment rules to determine fulfillment requirements and a fulfillment provider 122 for the needed/wanted service (blocks 1920 and 1922). The example service management system 106 may then determine whether messages are to be transmitted to the determined service providers and fulfillment providers (block 1924). For example, the service management system 106 may not transmit messages if the consumer 102 (via the registration information 1901) requests to review service providers and provide a confirmation message 1925. Alternatively, the consumer 102 may specify that service providers may be notified of any service needs/wants of the consumer 102 without prior approval and/or notification.

If messages are to be transmitted, the example service management system 106 transmits service request messages 1927 to the determined service providers 120 (block 1926). The example service management system 106 also transmits fulfillment request messages 1929 to the determined fulfillment providers 122 (block 1928). The example service management system 106 may then return to requesting/receiving additional service data (block 1904). However, if messages are not to be transmitted (per request from a consumer), the example service management system 106 publishes the service and fulfillment requests for viewing on a website (block 1930). At this point, any service provider and/or fulfillment provider may view and respond to the service and/or fulfillment requests. It should be appreciated that the service management system 106 may also publish a service request conditioned upon the consumer 102 rejecting (or being unable to come to an agreement with) the service providers determined in step 1918. This configuration enables the consumer 102 to publish a request for service if initially determined service providers do not attend to the needed/wanted service. The example procedure 1900 then returns to step 1904 to request additional service data.

The example procedure 1950 of FIGS. 19 and 20 operates on, for example, the devices 108 of the consumer 102 of FIGS. 1 to 5. The procedure 1950 begins when the consumer 102 transmits registration information 1901 to the service management system 106 to register one or more devices 108 and/or one or more accounts (block 1952). The consumer 102 may also specify within the registration information 1901 to receive messages 1919 identifying service providers before those providers are notified about the service need/want.

The example procedure 1950 continues when one or more of the devices 108 associated with the consumer 102 generate or create service data (block 1954). This step includes a consumer 102 creating service data within one or more applications. A determination is then made as to whether the service data is to be transmitted to an information source 104 (block 1956). For example, if the service data is application-related data or enterprise system-related data, the service data 1905c is transmitted to the information source 104. However, if the service data is not to be transmitted to the information source 104, the one or more devices 108 associated with the consumer 102 transmit the service data 1905a to the service management system 106. These devices 108 may use, for example, the application 110 of FIG. 1 to manage the collection and transmission of the service data. In some examples, the one or more devices 108 may transmit the service data 1905a responsive to receiving a request from the service management system 106.

The example consumer 102 next receives a message 1919 that specifies one more determined service providers 120 (block 1958). This step may be skipped if the consumer 102 indicates within the registration information 1901 to forgo reviewing and confirming service providers. The example procedure 1950 continues by determining if the consumer 102 is to confirm or select one of the service providers (block 1960). Conditioned on the consumer 102 having to select or confirm a service provider, the consumer 102 reviews the service provider information and selects a provider. The consumer 102 (via a device 108) transmits a confirmation message 1925 to the service management system 106 identifying the selected service provider (block 1962). The consumer 102 may also reject all the service providers and/or request information from the service providers, such as a quote. Some time later the consumer 102 receives the needed/wanted service (block 1964) from the selected service provider 120. The example procedure 1950 then returns to creating and/or transmitting service data (block 1954). It should be appreciated that the consumer 102 may also create service data during the execution of each of the steps 1956 to 1964.

The example procedure 1980 of FIGS. 19 and 20 operates on, for example, the information source 104 of FIGS. 1 to 5. The procedure 1980 begins when the information source 104 receives service data 1905c from one or more devices 108 associated with a consumer 102 (block 1982). The example information source 104 then processes the service data and/or augments the service data (block 1984). The information source 104 also formats and stores the service data to one or more data structures accessible to external applications.

The example information source 104 next determines whether an API call or other request message 1903 is received (block 1986). If the message 1903 has not been received, the information source 104 continues receiving, processing, and storing service data (blocks 1982 and 1984). However, if the message 1903 has been received, the example information source 104 determines service data identified within the message 1903 (block 1988). The identification may be based on consumer information, device information, a service data type, etc. The example information source 104 then transmits the determined service data 1905b to the service management system 106. The information source 104 then continues to receive, process, and store service data (blocks 1982 and 1984).

Processor

A detailed block diagram of electrical systems of an example computing component (e.g., the information source 104, the device 108, the service management system 106, the adapter 112, the aggregator 114, the content router 116, and/or the manager 118 of FIGS. 1 to 5) is illustrated in FIG. 21. In this example, the components 104, 106, 108, 112, 114, 116, and/or 118 include a main unit 2102, which preferably includes one or more processors 2104 communicatively coupled by an address/data bus 2106 to one or more memory devices 2108, other computer circuitry 2110, and one or more interface circuits 2112. The processor 2104 may be any suitable processor, such as a microprocessor from the INTEL PENTIUM® or CORE™ family of microprocessors. The memory 2108 preferably includes volatile memory and non-volatile memory. Preferably, the memory 2108 stores a software program that interacts with the other devices in the environment 100, as described above. This program may be executed by the processor 2104 in any suitable manner. In an example embodiment, memory 2108 may be part of a "cloud" such that cloud computing may be utilized by the components 104, 106, 108, 112, 114, 116, and/or 118. The memory 2108 may also store digital data indicative of documents, files, programs, service data, webpages, etc. retrieved from (or loaded via) the components 104, 106, 108, 112, 114, 116, and/or 118.

The example memory devices 2108 store software instructions 2123, webpages 2124, user interface features, permissions, protocols, service data, requests, consumer information, registration information, and/or configurations. The memory devices 2108 also may store network or system interface features 2126, permissions, protocols, configuration, and/or API call information 2128 for use by the components 104, 106, 108, 112, 114, 116, and/or 118. It will be appreciated that many other data fields and records may be stored in the memory device 2108 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 2112 may be implemented using any suitable interface standard, such as an Ethernet interface and/or a Universal Serial Bus (USB) interface. One or more input devices 2114 may be connected to the interface circuit 2112 for entering data and commands into the main unit 2102. For example, the input device 2114 may be a keyboard, mouse, touch screen, track pad, track ball, isopoint, image sensor, character recognition, barcode scanner, microphone, and/or a speech or voice recognition system.

One or more displays, printers, speakers, and/or other output devices 2116 may also be connected to the main unit 2102 via the interface circuit 2112. The display may be a cathode ray tube (CRTs), a liquid crystal display (LCD), or any other type of display. The display generates visual displays generated during operation of the components 104, 106, 108, 112, 114, 116, and/or 118. For example, the display may provide a user interface and may display one or more webpages received from the components 104, 106, 108, 112, 114, 116, and/or 118. A user interface may include prompts for human input from a user of the components 104, 106, 108, 112, 114, 116, and/or 118 including links, buttons, tabs, checkboxes, thumbnails, text fields, drop down boxes, etc., and may provide various outputs in response to the user inputs, such as text, service data, videos, audio, and animations.

One or more storage devices 2108 may also be connected to the main unit 2102 via the interface circuit 2112. For example, a hard drive, CD drive, DVD drive, and/or other storage devices may be connected to the main unit 2102. The storage devices 2118 may store any type of data, such as identifiers, service data, registration information, consumer information, device information, historical access or usage data, statistical data, security data, etc., which may be used by the components 104, 106, 108, 112, 114, 116, and/or 118.

The computing components 104, 106, 108, 112, 114, 116, and/or 118 may also exchange data with other network devices 2120 via a connection to a network 2121 (e.g., the Internet) or a wireless transceiver 2122 connected to the network 2121. Network devices 2120 may include one or more servers, which may be used to store certain types of data, and particularly large volumes of data which may be stored in one or more data repository. A server may process or manage any kind of data including databases, programs, files, libraries, service data, device information, consumer registration information, identifiers, historical access or usage data, statistical data, security data, etc. A server may store and operate various applications relating to receiving, transmitting, processing, and storing the large volumes of data. It should be appreciated that various configurations of one or more servers may be used to support, maintain, or implement the components 104, 106, 108, 112, 114, 116, and/or 118 of the environment 100. For example, servers may be operated by various different entities, including application hosts, enterprise systems, businesses, consumers, data storage providers, data processing providers, etc. Also, certain data may be stored in one of the components 104, 106, 108, 112, 114, 116, and/or 118 which is also stored on a server, either temporarily or permanently, for example in memory 1608 or storage device 2118. The network connection may be any type of network connection, such as an Ethernet connection, digital subscriber line (DSL), telephone line, coaxial cable, wireless connection, etc.

Access to the components 104, 106, 108, 112, 114, 116, and/or 118 can be controlled by appropriate security software or security measures. An individual third-party client or consumer's access can be defined by the components 104, 106, 108, 112, 114, 116, and/or 118 and limited to certain data and/or actions. Accordingly, users of the environment 100 may be required to register with one or more computing components 104, 106, 108, 112, 114, 116, and/or 118.

CONCLUSION

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
receiving service data, via a server, from an information source;
selecting, via the server, a source data model, among a plurality of source data models, that is associated with the information source, the source data model being configured to specify how the service data in a first format from the information source is to be mapped to data fields of a generic service data model, the source data model including a plurality of linguistic maps each including a keyword linked to predetermined terms or phrases that express a similar consumer service need as the keyword;
identifying, via the server, a target keyword related to the service data that is indicative of a service need by
determining a linguistic map score for each of the plurality of linguistic maps included with the selected source data model based on matches between terms or phrases of the service data to the predetermined terms or phrases of the respective linguistic map,
selecting the linguistic map, of the plurality of linguistic maps included with the selected source data model, with a greatest linguistic map score, and
determining, as the target keyword, the keyword that corresponds to the selected linguistic map;
creating, via the server, a service data entry of the generic service data model by applying the selected source data model to the service data and storing the appropriate portions of the service data, including the determined target keyword, into data fields of the service data entry;
determining, via the server, the service need by applying service rules to the service data, including the determined target keyword, within the data fields of the service data entry;
selecting, via the server, a service provider based on the service data, including the determined target keyword, within the data fields of the service data entry;
determining, via the server, a fulfillment requirement of the service need by applying fulfillment rules to the service data, including the determined target keyword, within the data fields of the service data entry;
selecting, via the server, a fulfillment provider based on the service data, including the determined target keyword, within the data fields of the service data entry;
transmitting, via the server, a service request message to the service provider including at least some of the service data within the data fields of the service data entry; and
publishing, via the server, a fulfillment request to a webpage accessible by fulfillment providers, the fulfillment request including at least some of the service data within the data fields of the service data entry.

2. A method comprising:
receiving service data, via a server, from an information source;
selecting, via the server, a source data model, among a plurality of source data models, that is associated with the information source, the source data model being configured to specify how the service data in a first format from the information source is to be mapped to data fields of a generic service data model, the source data model including a plurality of linguistic maps each including a keyword linked to predetermined terms or phrases that express a similar consumer service need as the keyword;
identifying, via the server, a service-orientated keyword related to the service data that is indicative of a service type by
determining a linguistic map score for each of the plurality of linguistic maps included with the selected source data model based on matches between terms or phrases of the service data to the predetermined terms or phrases of the corresponding linguistic map,
selecting the linguistic map, of the plurality of linguistic maps included with the selected source data model, with a greatest linguistic map score, and
determining as the service-orientated keyword, the keyword that corresponds to the selected linguistic map;
creating, via the server, a service data entry of the generic service data model by applying the selected source data model to the service data and storing the appropriate portions of the service data, including the determined service-orientated keyword, into data fields of the service data entry;
selecting, via the server, a service provider based on the service data, including the determined service-orientated keyword, within the data fields of the service data entry; and
transmitting, via the server, a service request message to the service provider including at least some of the service data within the data fields of the service data entry.

3. The method of claim 2, wherein each of the linguistic maps link the different terms or phrases of the service data with a different service need; further comprising determining, via the server, a time to transmit the service request message based on the indication of the service need.

4. The method of claim 2, wherein the information source includes at least one of a consumer device, an application host, and an enterprise system.

5. The method of claim 2, further comprising:
providing, via the server, an indication of the service provider to a consumer associated with the service data; and
condition upon receiving an acknowledgment response from the consumer, transmitting, via the server, the service request message to the service provider.

6. The method of claim 2, further comprising:
determining other messages transmitted to the service provider for the same service within a time period;
determining a total service need based on the needed services within the other messages and the service request message; and
transmitting a total service message to the service provider indicating the total service need.

7. The method of claim 2, wherein transmitting the service request message includes making the information included within the service request message available to the service provider on a web service hosted by the server.

8. The method of claim 2, further comprising:
determining, via the server, a fulfillment service needed by the service provider to fulfill the service to be provided;
determining, via the server, a service fulfillment provider to fulfill the service to be provided by the service provider; and transmitting, via the server, a service fulfillment request message to the service fulfillment provider including an indication of the fulfillment service needed by the service provider.

9. The method of claim 2, further comprising:
determining a staffing level of the service provider based on the service data within the data fields of the service data entry;
determining staffing parameters based on the service data within the data fields of the service data entry; and
transmitting a staffing message to the service provider including an indication of the staffing level and the staffing parameters.

10. The method of claim 9, further comprising:
identifying individuals associated with the service provider based on the staffing level and the staffing parameters; and
transmitting the staffing message to the identified individuals.

11. An apparatus comprising:
an adapter processor communicatively coupled to a memory storing first machine-readable instructions, which when executed, cause the adapter processor to:
transmit a request for service data message to an application programmable interface of a communicatively coupled information source, and
responsive to the request for service data message, receive service data from the information source;
an aggregator processor communicatively coupled to the memory storing second machine-readable instructions, which when executed, cause the aggregator processor to:
select a source data model from among a plurality of source data models based on the information source, the source data model including a plurality of linguistic maps each including a keyword linked to predetermined terms or phrases that express a similar consumer service need as the keyword, and
create a service data entry of a generic service data model by applying the selected source data model to the service data and storing the appropriate portions of the service data into data fields of the service data entry;
a service data converter communicatively coupled to the memory storing third machine-readable instructions, which when executed, cause the service data converter to identify a target keyword related to the service data by
determining a linguistic map score for each of the plurality of linguistic maps included with the selected source data model based on matches between terms or phrases of the service data to the predetermined terms or phrases of the respective linguistic map,
selecting the linguistic map, of the plurality of linguistic maps included with the selected source data model, with a greatest linguistic map score,
determining as the target keyword, the keyword that corresponds to the selected linguistic map, and
storing the target keyword to at least one of the data fields of the service data entry; and
a content router communicatively coupled to the memory storing fourth machine-readable instructions, which when executed, cause the content router to:
select a service provider based on the service data, including the determined target keyword, within the data fields of the service data entry, and
transmit a service request message to the service provider including an indication of the service data within the data fields of the service data entry.

12. The apparatus of claim 11, further comprising a database configured to store the plurality of source data models, each of the source data models being configured to specify how service data in a format from a particular information source is to be mapped to the data fields of the generic service data model.

13. The apparatus of claim 11, wherein the content router is configured to determine the service provider by:
applying service rules to the service data, including the determined target keyword, within the data fields of the service data entry to determine a service need; and
determining the service provider is associated with the service need.

14. The apparatus of claim 13, wherein applying the service rules includes:
comparing the target keyword stored in at least one of the data fields of the service data entry to a data structure that includes service provider information.

15. The apparatus of claim 11, further comprising a management processor communicatively coupled to the memory storing fifth machine-readable instructions, which when executed, cause the management processor to:
prior to receiving the service data, receive a service preapproval indication from a consumer associated with the service data; and
after receiving the service data, transmit a service preapproval message to the service provider indicating the service provider may provide a service defined by the service data within the data fields of the service data entry without having to request approval from the consumer.

16. The apparatus of claim 11, wherein the content router is configured to:
determine a second service provider based on the service data within the data fields of the service data entry, and
transmit a second service request message to the second service provider including the indication of the service data within the data fields of the service data entry.

17. The apparatus of claim 11, further comprising a management processor communicatively coupled to the memory storing fifth machine-readable instructions, which when executed, cause the management processor to:
determine that at least two service providers were selected; and
transmit a message to a consumer to select one of the service providers.

18. The apparatus of claim 17, wherein the management processor configured to:
transmit a message to the two selected service providers requesting information including at least one of a quote and a description of the service provider;
receive a response from each of the service providers; and
make the response from each of the service providers available to the consumer.

19. A non-transitory machine-accessible device having instructions stored thereon that are configured when executed to cause a machine to at least:
receive service data from an information source;
select a source data model, among a plurality of source data models, that is associated with the information source, the source data model being configured to specify how the service data in a first format from the information source is to be stored to data fields of a generic service data model, the source data model including a plurality of linguistic maps each including a keyword linked to predetermined terms or phrases that express a similar consumer service need as the keyword;

identifying, via the server, target keywords related to the service data that is indicative of a service need by determining a linguistic map score for each of the plurality of linguistic maps included with the selected source data model based on matches between terms or phrases of the service data to the predetermined terms or phrases of the linguistic map, selecting the linguistic maps, of the plurality of linguistic maps included with the selected source data model, with scores greater than a threshold, and determining as the target keywords, the keywords that corresponds to the selected linguistic maps;

create a service data entry of the generic service data model by applying the selected source data model to the service data and storing the appropriate portions of the service data, including the determined target keywords, into data fields of the service data entry;

determine the service need by applying service rules to the service data, including the determined target keywords, within the data fields of the service data entry;

select a service provider based on the determined service need and the service data within the data fields of the service data entry; and transmit a service request message to the service provider including an indication of the service need.

20. The machine-accessible device of claim 19, further comprising instructions stored thereon that are configured when executed to cause a machine to at least determine the service need by:

conditioned on one of the target keywords being 'need', determining the service need exists as a need; and conditioned on one of the target keywords being 'want', determining the service need exists as a want.

21. The machine-accessible device of claim 19, further comprising instructions stored thereon that are configured when executed to cause a machine to at least determine the service need by:

conditioned on one of the selected linguistic maps matching a service type, determining the service need includes the matched service type.

* * * * *